US011974098B2

(12) United States Patent
Sigwanz et al.

(10) Patent No.: US 11,974,098 B2
(45) Date of Patent: Apr. 30, 2024

(54) SYSTEMS AND METHODS FOR VISUALIZING EFFECTS OF A FREQUENCY LOWERING SCHEME IMPLEMENTED BY A HEARING DEVICE

(71) Applicant: SONOVA AG, Staefa (CH)

(72) Inventors: Ullrich Sigwanz, Hombrechtikon (CH); Robert Baur, Männedorf (CH)

(73) Assignee: Sonova AG, Staefa (CH)

( * ) Notice: Subject to any disclaimer, the term of this patent is extended or adjusted under 35 U.S.C. 154(b) by 220 days.

(21) Appl. No.: 17/701,155

(22) Filed: Mar. 22, 2022

(65) Prior Publication Data

US 2023/0308818 A1 Sep. 28, 2023

(51) Int. Cl.
*H04R 25/00* (2006.01)

(52) U.S. Cl.
CPC ........... *H04R 25/558* (2013.01); *H04R 25/70* (2013.01)

(58) Field of Classification Search
CPC .. H04R 25/505; H04R 25/552; H04R 25/554; H04R 2225/51; H04R 2225/31; H04R 2225/61
See application file for complete search history.

(56) References Cited

U.S. PATENT DOCUMENTS

| | | | | |
|---|---|---|---|---|
| 9,807,519 B2 * | 10/2017 | Brungart .............. | H04R 29/008 |
| 9,897,519 B2 | 2/2018 | Suzuki et al. | |
| 2004/0264721 A1 * | 12/2004 | Allegro ................ | H04R 25/353 381/316 |
| 2016/0205482 A1 * | 7/2016 | Raether ................ | H04R 25/353 381/314 |

* cited by examiner

*Primary Examiner* — Brian Ensey
(74) *Attorney, Agent, or Firm* — ALG Intellectual Property, LLC

(57) ABSTRACT

An exemplary system includes a processor communicatively coupled to a memory and configured to execute instructions to provide a frequency lowering scheme that maps at least some audio frequencies included in a first set of audio frequencies to relatively lower audio frequencies to form a second set of audio frequencies, provide a first output frequency-based curve representing a set of values of a fitting-related parameter at frequencies included in the second set of audio frequencies, generate, based on an inverse application of the frequency lowering scheme, a second output frequency-based curve representing the set of values of the fitting-related parameter with respect to the first set of audio frequencies, and present a graph including a first axis to which the first set of audio frequencies is assigned, a second axis to which a quantification of the fitting-related parameter is assigned, and the second frequency-based curve.

20 Claims, 16 Drawing Sheets

SYSTEMS AND METHODS FOR VISUALIZING EFFECTS OF A FREQUENCY LOWERING SCHEME IMPLEMENTED BY A HEARING DEVICE

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

When a hearing device is initially provided to a user, and during follow-up tests and checkups thereafter, it is usually necessary to "fit" the hearing device to the user. Fitting of a hearing device to a user is typically performed by an audiologist or the like who presents various stimuli having different loudness levels to the user. The audiologist relies on subjective feedback from the user as to how such stimuli are perceived. The subjective feedback may then be used to generate an audiogram that indicates individual hearing thresholds and loudness comfort levels of the user.

An audiogram of a user of a hearing device typically includes a sloping hearing loss profile where a user's ability to perceive sound decreases with an increase in frequency. Because of this, the amount of gain needed for the user to perceive sounds at certain high frequency ranges is often larger than the hearing device is capable of providing. To facilitate the user perceiving sounds at such high frequency ranges, the hearing device may implement a frequency lowering scheme that is generally configured to map higher frequencies, that are, based on the audiogram of the user, predicted to be inaudible to a user, to lower frequencies that are, based on the audiogram of the user, predicted to be audible. The effects of such frequency lowering are typically depicted within a conventional user interface that includes a graph showing output level over output frequency and one or more audibility threshold curves. Based on the frequency lowering, portions of the one or more audibility threshold curves (e.g., gain curves, output curves, etc.) represented in the graph are compressed due to the mapping of the higher frequencies to the lower frequencies. As a result, an observable area in a conventional user interface where frequency lowering is applied gets smaller and more overcrowded as more frequency lowering is applied. This effect is compounded when multiple different audibility threshold curves are displayed concurrently, resulting in squeezed or overlaying curves and narrowed observable frequency ranges that make it difficult for an audiologist to understand the impact and outcome of applying a frequency lowering scheme. As such, with conventional user interfaces, it is often difficult or impossible for an audiologist to adequately visualize the gain of audibility that may occur as a result of frequency lowering and/or determine how implementing a frequency lowering scheme affects the user's perception of sound.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
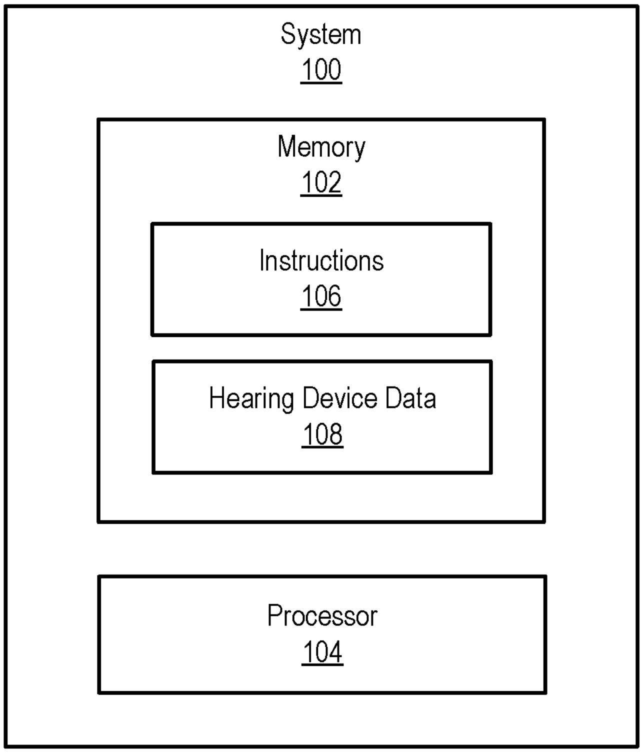
FIG. 1 illustrates an exemplary system that may be implemented according to principles described herein.

Systems and methods for visualizing effects of a frequency lowering scheme implemented by a hearing device are described herein. As will be described in more detail below, an exemplary system may comprise a memory storing instructions and a processor communicatively coupled to the memory and configured to execute the instructions to provide a frequency lowering scheme that is configured to be applied by a hearing device and that maps at least some audio frequencies included in a first set of audio frequencies (also referred to herein as input audio frequencies) to relatively lower audio frequencies to form a second set of audio frequencies (also referred to herein as output audio frequencies), provide a first output frequency-based curve representing a set of values of a fitting-related parameter at frequencies included in the second set of audio frequencies. Based on an inverse application of the frequency lowering scheme to the first output frequency-based curve, the processor may further execute the instructions to generate a second output frequency-based curve representing the set of values of the fitting-related parameter with respect to the first set of audio frequencies instead of the second set of audio frequencies. The processor may further execute the instructions to present, within a graphical user interface view displayed on a display device, a graph that may include a first axis to which the first set of audio frequencies is assigned, a second axis to which a quantification of the fitting-related parameter is assigned, and the second output frequency-based curve represented with respect to the first set of audio frequencies along the first axis.

In another exemplary system, the processor may be configured to execute the instructions to detect a selection of a frequency lowering setting to be used by a hearing device configured to implement a frequency lowering scheme that maps at least some audio frequencies included in a first set of audio frequencies to relatively lower audio frequencies to form a second set of audio frequencies and present, within a graphical user interface view displayed on a display device and based on the selection of the frequency lowering setting, a graph that may include a first axis to which the first set of audio frequencies is assigned, a second axis to which a quantification of a fitting-related parameter is assigned, and an output frequency-based curve represented with respect to the first set of audio frequencies along the first axis. The output frequency-based curve may be generated based on an inverse application of the frequency lowering scheme that results in a set of values of the fitting-related parameter at the second set of audio frequencies being represented with respect to the first set of audio frequencies instead of the second set of audio frequencies.

By providing systems and methods such as those described herein, it may be possible to better visualize effects of frequency lowering as compared to conventional methods. For example, systems and methods such as those described herein may make an area of interest (e.g., a compressed frequency area) in a graphical user interface view more easily visible as compared to conventional methods. Through graphical user interface views such as those described herein, an audiologist or the like may easily determine how frequency lowering affects hearing thresholds of a user of a hearing device and use that information to improve a fitting of the hearing device to the user. In addition, systems and methods such as those described herein facilitate an audiologist visualizing the available gain of a fitting range in relation to a strength of a frequency lowering setting. Other benefits of the systems and methods described herein will be made apparent herein.

FIG. 1 illustrates an exemplary system 100 that may be implemented according to principles described herein. System 100 may be implemented by any number of computing devices, such as one or more fitting devices, personal computers, mobile devices (e.g., a smartphone or a tablet computer), etc. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and processor 104 may be distributed between multiple devices (e.g., multiple computing devices) and/or multiple locations as may serve a particular implementation.

Memory 102 may maintain (e.g., store) executable data used by processor 104 to perform any of the operations associated with system 100 described herein. For example, memory 102 may store instructions 106 that may be executed by processor 104 to perform any of the operations associated with system 100 described herein. Instructions 106 may be implemented by any suitable application, software, code, and/or other executable data instance.

As shown in FIG. 1, memory 102 may also store hearing device data 108 that may include any suitable data associated with a hearing device that may be communicatively coupled to system 100. For example, hearing device data 108 may include any suitable settings, control parameters, operating programs, frequency lowering schemes, fitting programs, hearing thresholds, audibility curves (e.g., gain level curves, target gain level curves, output level curves, target output level curves), etc. that may be associated with a hearing device communicatively coupled to system 100 and/or a user of the hearing device. In certain examples, hearing device data 108 may include data that is specific to a particular user of a hearing device. For example, hearing device data 108 may include data associated with one or more target gain profiles associated with a particular user.

Memory 102 may also maintain any data received, generated, managed, used, and/or transmitted by processor 104. For example, memory 102 may maintain any data suitable to facilitate communications (e.g., wired and/or wireless communications) between system 100 and one or more hearing devices, such as those described herein. Memory 102 may maintain additional or alternative data in other implementations.

Processor 104 may be implemented by one or more processors included in one or more computing devices and is configured to perform any suitable processing operation that may be associated with system 100. For example, processor 104 may be configured to perform (e.g., execute instructions 106 stored in memory 102 to perform) various processing operations associated with visualizing effects of implementing a frequency lowering scheme by a hearing device. For example, such processing operations may include providing one or more graphical user interfaces such as those described herein for display to a user to facilitate a user (e.g., an audiologist) visualizing effect of frequency lowering and/or fitting a hearing device to a user. These and other operations that may be performed by processor 104 are described herein.

Figure 2:
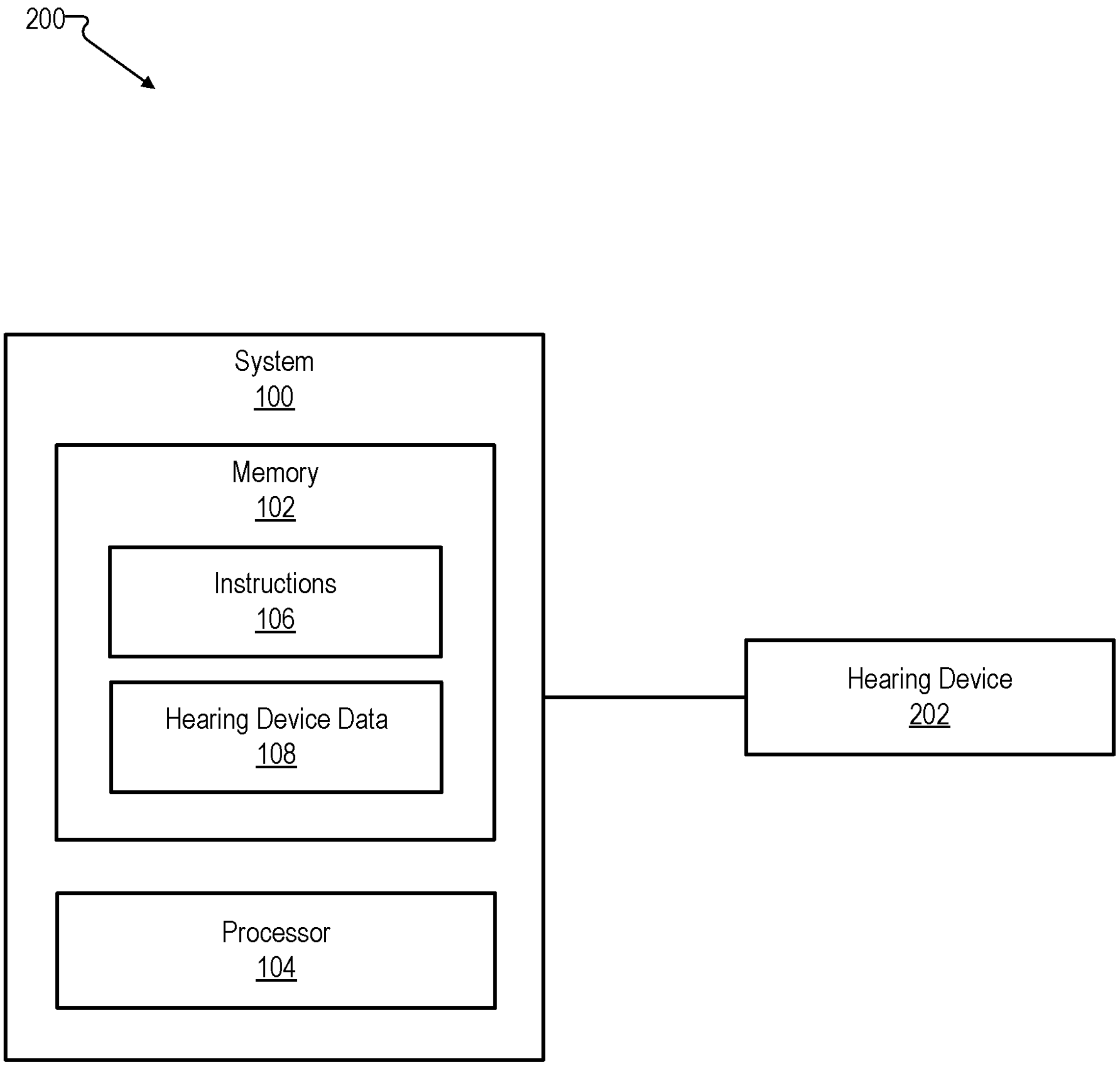
FIG. 2 illustrates an exemplary implementation of the system of FIG. 1 according to principles described herein.

FIG. 2 shows an exemplary configuration 200 in which system 100 may be implemented. As shown in FIG. 2, system 100 may be selectively and communicatively coupled to a hearing device 202. As used herein, a "hearing device" may be implemented by any device configured to provide or enhance hearing to a user. For example, a hearing device may be implemented by one or more hearing aids configured to amplify audio content to a user, a sound processor included in a cochlear implant system configured to apply electrical stimulation representative of audio content to a user, a sound processor included in a stimulation system configured to apply electrical and acoustic stimulation to a user, or any other suitable hearing prosthesis or combination of hearing prostheses. In some examples, a hearing device may be implemented by a behind-the-ear ("BTE") hearing device configured to be worn behind an ear and/or at least partially within an ear canal of a user.

System 100 may be communicatively coupled to hearing device 202 in any suitable manner and through any suitable communication interface. For example, system 100 may be wirelessly connected to hearing device 202 using any suitable wireless communication protocol. Alternatively, system 100 may be communicatively coupled to hearing device 202 by way of a wired connection.

Although only one hearing device 202 is shown in FIG. 2, it is understood that hearing device 202 may be included in a system that includes more than one hearing device configured to provide or enhance hearing to a user. For example, hearing device 202 may be included in a binaural hearing system that includes two hearing devices, one for each ear. In such examples, hearing device 202 may be provided behind, for example, the left ear of the user and an additional hearing device may be provided behind the right ear of the user. When hearing device 202 is included as part of a binaural hearing system, hearing device 202 may communicate with the additional hearing device by way of a binaural communication link that interconnects hearing device 202 with the additional hearing device. Such a binaural communication link may include any suitable wireless or wired communication link as may serve a particular implementation.

Hearing device 202 may be fit to a user based on an audiogram of the user. Such an audiogram may indicate a first set of hearing thresholds, for the user, at a first set of audio frequencies (e.g., across a range of audio frequencies from 125 Hz to 8 kHz). An audiogram of a user of hearing device 202 may typically indicate that the user has better audibility in a relatively lower frequency range (e.g., between 125 Hz and 1 kHz) and degraded audibility at higher frequencies (e.g., between 1 kHz and 8 kHz). In view of this, system 100 may implement a frequency lowering scheme to restore audibility of high frequencies for a user. For example, system 100 may apply a frequency lowering scheme that maps a first set of audio frequencies to a second set of audio frequencies lower than the first set of audio frequencies. System 100 may implement any suitable type of frequency lowering scheme as may serve a particular implementation. Exemplary types of frequency lowering schemes may include a frequency compression scheme, (e.g., non-linear frequency compression, adaptive non-linear frequency compression, linear frequency compression, etc.), a frequency transposition scheme, a frequency composition scheme, or any other suitable type of frequency lowering scheme.

As part of fitting hearing device 202 to a user, one or more graphical user interface views may be provided for display by a display device to a hearing care professional (e.g., an audiologist or the like). System 100 may provide such graphical user interfaces for display at any suitable time and on any suitable display device that may be part of or communicatively coupled to system 100. For example, such graphical user interfaces may be provided for display to a user by way of a laptop computer, a tablet computer, a smartphone, etc. that may be communicatively coupled to system 100.

Such graphical user interface views may depict a graph having a first axis (e.g., an x-axis) to which audio frequencies are assigned and a second axis (e.g., a y-axis) to which a quantification of a fitting-related parameter (e.g., output sound pressure levels, output levels, gain levels, etc.) is assigned. The first axis may be represented within a graphical user interface view in any suitable manner. For example, in certain implementations, the first axis may be labeled in hertz values (e.g., 500 Hz, 1 kHz, 2 kHz, 4 kHz, 8 kHz, etc.) that are logarithmically equidistant. In certain alternative examples, the first axis may be labeled in hertz values that are not logarithmically equidistant (e.g., 500 Hz, 1 kHz, 1.5 kHz, 2 kHz, etc.).

In certain alternative examples, portions of the audio frequencies along the first axis may be labeled in hertz values that increase differently than other portions of the audio frequencies. For example, the first axis may be labeled in hertz values that are logarithmically equidistant (e.g., factor 2) below a cut-off frequency (e.g., below 2 kHz) and logarithmically equidistant (e.g., factor 1.5) above the cut-off frequency.

The graph depicted in such graphical user interface views may include one or more curves that show, for example, hearing thresholds, target gain prescriptions, etc. for the user of hearing device 202 across the frequencies assigned to the first axis. Conventional graphical user interface views typically depict how a first set of audio frequencies (also referred to herein as input audio frequencies) is processed to a second set of audio frequencies (also referred to herein as output audio frequencies) lower than the first set of audio frequencies based on application of a frequency lowering scheme. However, when frequency lowering is applied, such conventional graphical user interface views typically result in overcrowded graphs with squeezed or overlaying curves and narrowed observable frequency ranges. This makes it difficult or impossible for a hearing care professional to adequately evaluate an impact and outcome of an applied frequency lowering scheme.

To facilitate a hearing care professional better visualizing the effects of frequency lowering, graphical user interface views such as those described herein may include one or more graphs depicting a set of values of a fitting-related parameter (e.g., gain levels and/or output levels) not in relation to a range of output audio frequencies but rather in relation to a range of input audio frequencies that result in generating corresponding frequency lowered values for the fitting-related parameter. With such graphical user interface views, the first axis (e.g., an x-axis) may show a complete input audio frequency range (e.g., a range of audio frequencies from 125 Hz to 8 kHz) whereas the second axis (e.g., a y-axis) may show values of a fitting-related parameter (e.g., output or gain sound levels) generated by a sound event generated at an indicated input audio frequency but that will be audible for the user of hearing device 202 at frequency lowered frequencies. Exemplary graphical user interface views and graphs are described further herein.

In certain examples, system 100 may present a graphical user interface view that includes a plurality of different graphs. For example, a graphical user interface view may include a first graph and/or a second graph that is different from the first graph. The first graph may include a first axis to which the first set of audio frequencies is assigned and a second axis to which a quantification of a fitting-related parameter is assigned. The fitting-related parameter may correspond to any suitable parameter that may be useful in fitting hearing device 202 to a user. For example, the fitting-related parameter may correspond to a hearing threshold, a gain level, an output level, and/or any other suitable parameter. In certain examples, the fitting-related parameter may correspond to a sound level and the quantification assigned to the second axis may represent output sound levels. In certain examples, the output levels may correspond to output sound pressure levels. The second graph may include a third axis to which the first set of audio frequencies is assigned and a fourth axis to which output gain levels are assigned.

In such examples, the first graph and the second graph may include any suitable number of frequency-based curves as may serve a particular implementation. For example, the first graph may include a curve visualizing auditory thresholds of a user of the hearing device, and/or a curve visualizing environmental comfort thresholds of the user of the hearing device, and/or a curve visualizing feedback thresholds for the hearing device, and/or a curve visualizing a maximum achievable level for the hearing device, and/or a curve visualizing supplied isophones, and/or a curve visualizing a supplied isophone-like threshold or perception curve, and/or any other suitable type of curve. Additionally or alternatively, the first graph may include at least one input frequency-based curve that represents gain values at an output of the hearing device across the first set of audio frequencies along the first axis.

The at least one input frequency-based curved represented in the first graph may include any suitable type of curve as may serve a particular implementation. For example, the at least one input frequency-based curve may include a first output level curve corresponding to a first sound input level, and/or a second output level curve corresponding to a second sound input level, and/or a third output level curve corresponding to a third sound input level, a fourth output level curve corresponding to a current listening environment, and/or any other suitable curve. The first sound input level, the second sound input level, and the third sound input level may correspond to different sound input levels. For example, the first output level curve may correspond to an 80 dB sound input level, the second output level curve may correspond to a 65 dB sound input level, and the third output level curve may correspond to a 50 dB sound input level.

The second graph may include at least one input frequency-based curve that represents gain values at an output of gain of hearing device 202 across the first set of audio frequencies along the third axis. The at least one input frequency-based curve represented in the second graph may include any suitable type of curve as may serve a particular implementation. For example, the at least one input frequency-based curve presented in the second graph may include a first gain curve corresponding to a first sound input level, and/or a second gain curve corresponding to a second sound input level, and/or a third gain curve corresponding to a third sound input level, and/or a fourth gain curve corresponding to a current listening environment, and/or a fifth gain curve corresponding to an insertion gain curve, and/or any suitable other curve. The first sound input level, the second sound input level, and the third sound input level may correspond to different sound input levels. For example, the first output level curve may correspond to an 80 dB sound input level, the second output level curve may correspond to a 65 dB sound input level, and the third output level curve may correspond to a 50 dB sound input level.

In certain examples, system 100 may provide the first graph and the second graph for concurrent display within a graphical user interface view. System 100 may concurrently display the first graph and the second graph in any suitable manner. For example, the first graph may be displayed above the second graph, below the second graph, adjacent to a left side of the second graph, adjacent to a right side of the second graph, or in any other suitable manner. Exemplary graphical user interface views that illustrate one or more graphs are described herein.

System 100 may perform any suitable operation or combination of operations associated with generating graphical user interface views such as those described herein. For example, system 100 may be configured to provide a first output frequency-based curve representing a set of values of a fitting-related parameter at frequencies included in the second set of audio frequencies.

System 100 may provide the first output frequency-based curve in any suitable manner. For example, system 100 may provide the first output frequency-based curve such that the first output frequency-based curve includes a first portion that is not subject to frequency lowering and a second portion that is subject to frequency lowering. The second portion may correspond to a subset of the frequencies that may be subject to frequency lowering. For example, the first portion may be represented across a frequency range from 125 Hz to 2 kHz and the second portion may be represented across a frequency range from 2 kHz to 5 kHz. Exemplary curves that may correspond to a first output frequency-based curve are described herein.

In certain examples, system 100 may generate the first output frequency-based curve based on a frequency lowering scheme. System 100 may generate the first frequency-based curve in any suitable manner. For example, system 100 may apply the frequency lowering scheme to any suitable curve (e.g., a curve that represents a set of reference hearing thresholds) that may be represented in a graphical user interface view and may be used to fit hearing device 202 to a user. Exemplary frequency-based curves that may be used to generate the first frequency-based curve in certain examples are described herein.

After system 100 provides or otherwise generates the first frequency-based curve, system 100 may inversely apply the frequency lowering scheme to the first frequency-based curve to generate a second output frequency-based curve that represents the set of values of the fitting-related parameter with respect to the first set of audio frequencies instead of the second set of audio frequencies. The second output frequency-based curve may correspond to any suitable type of curve such as described herein that may be used to facilitate fitting hearing device 202 to a user.

Figure 3:
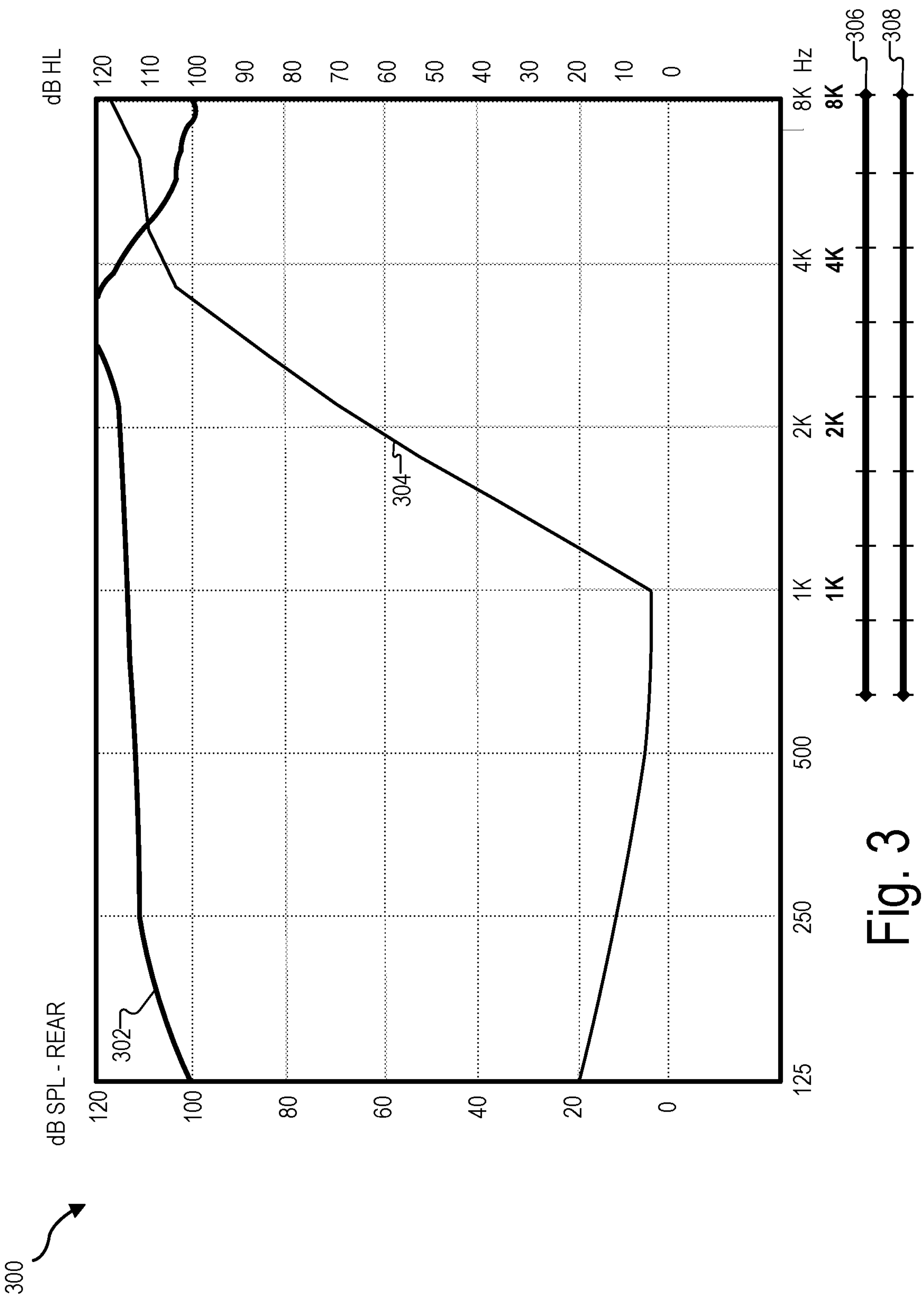
FIGS. 3-5 illustrate exemplary graphs that depict how an output frequency-based curve may be represented according to principles described herein.
Figure 4:
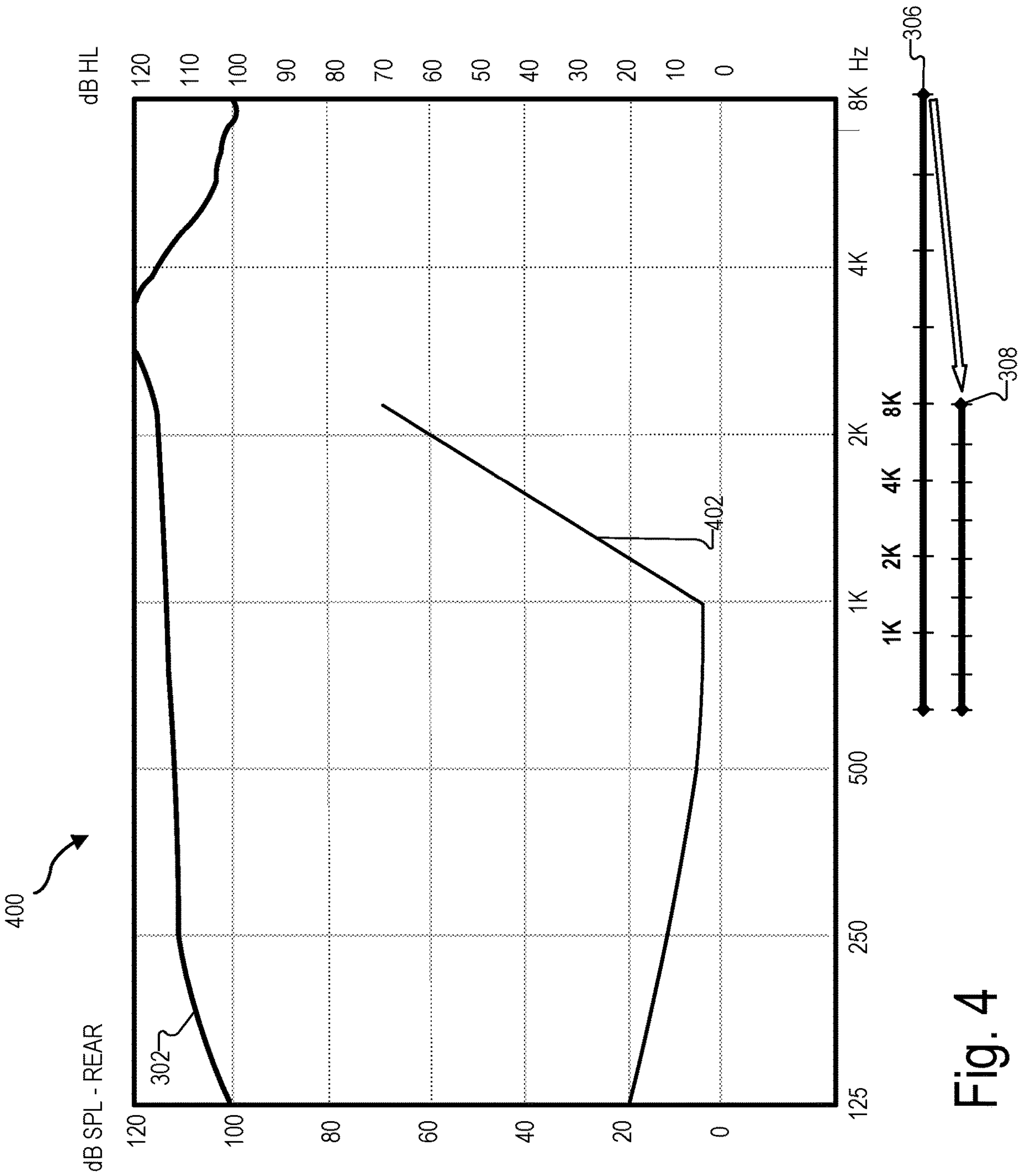
Figure 5:
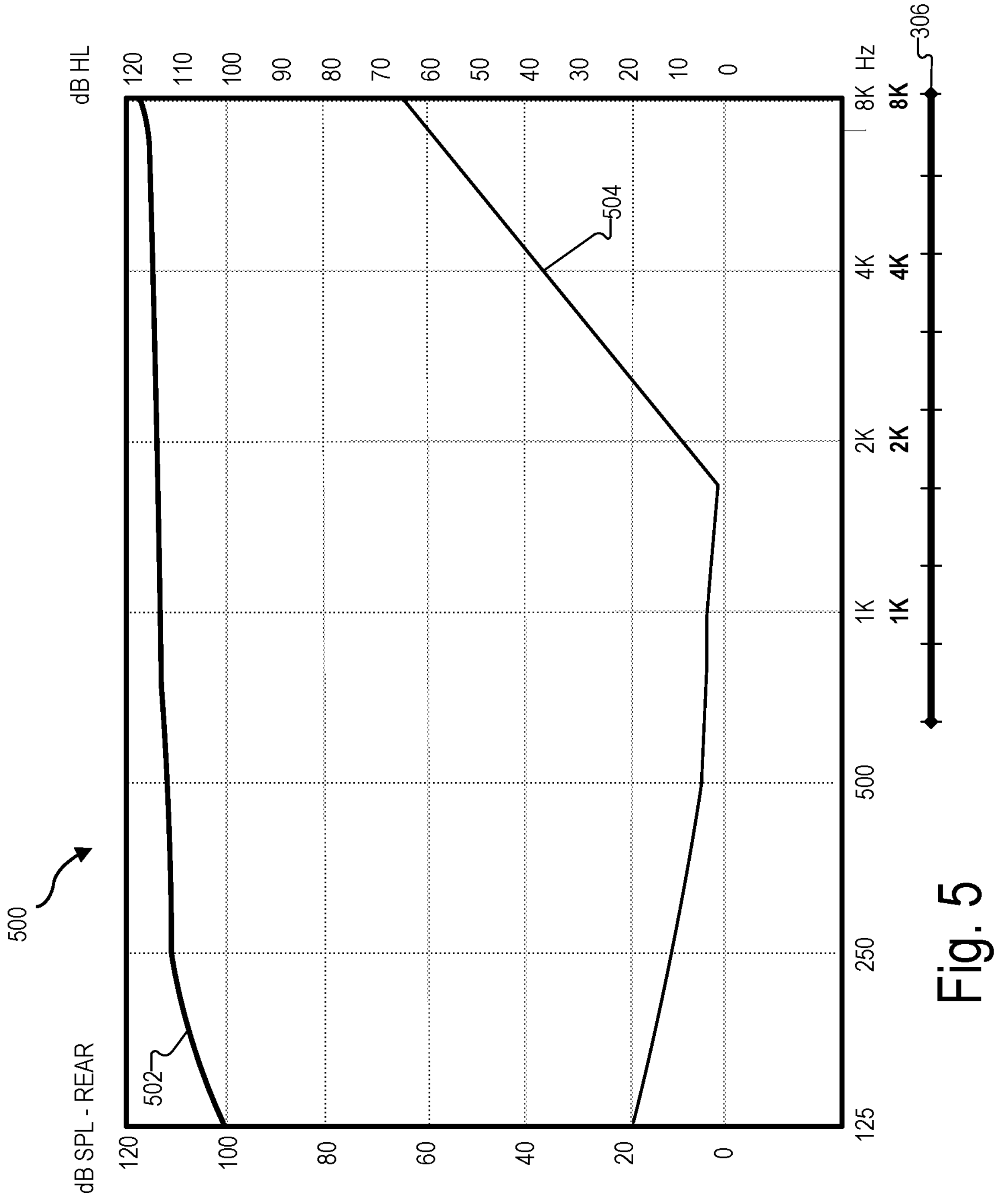

FIGS. 3-5 depict exemplary graphs 300-500 that show output frequency-based curves such as those described herein may be provided in certain examples. As shown in FIG. 3, graph 300 depicts frequency along the horizontal axis, sound pressure level along the left vertical axis, and an amount of gain along the right vertical axis. FIG. 3 further shows how a maximum output limit curve 302 and a frequency-based curve 304 may appear prior to application of a frequency lowering scheme. As shown in FIG. 3, a line graph 306 depicts a compressible range of audio frequencies and a line graph 308 depicts a compressed range. Line graph 306 shown in FIG. 3 may represent a portion of the first set of frequencies. Because line graph 306 and line graph 308 are the same length in FIG. 3, it is understood that no frequency compression is currently applied. Maximum output limit curve 302 may represent a maximum output capacity of hearing device 202.

Frequency-based curve 304 may represent any suitable type of curve that may be used to facilitate fitting hearing device 202 to a user. In the example shown in FIG. 3, frequency-based curve 304 is a sound pressure level curve that represents sound pressure levels needed at the ear drum of the user of hearing device 202 for the user to just perceive sounds across the range of frequencies shown in FIG. 3. As shown in FIG. 3, frequency-based curve 304 indicates that the user of hearing device 202 may have "normal" hearing from 125 Hz to 1 kHz. However, the audibility of the user decreases from 1 kHz to 8 kHz.

Between approximately 5 kHz and 8 kHz the sound pressure level needed at the ear drum of the user exceeds the maximum output capacity of hearing device 202. In view of this, system 100 may use a frequency lowering scheme to map higher frequencies, that are, based on the audiogram of the user, predicted to be inaudible to a user, to lower frequencies that are, based on the audiogram of the user, predicted to be audible.

To facilitate visualizing effects of such frequency lowering, system 100 may generate an output frequency-based curve based on frequency-based curve 304. To illustrate, FIG. 4 shows an exemplary graph 400 including an output frequency-based curve 402 that includes a first portion of frequency-based curve 304 in a frequency range from 125 Hz to approximately 600 Hz and a second portion of frequency-based curve 304 in a frequency range from approximately 600 Hz to approximately 2.4 kHz. As shown in FIG. 4, a portion of frequency-based curve 304 from approximately 2.4 kHz to 8 kHz is cut off and not used as part of output frequency-based curve 402. The frequency range from approximately 600 Hz to approximately 2.4 kHz may correspond to a portion of output frequency-based curve 402 that may be subject to an inverse application of the frequency compression scheme and/or that may be desirable to use to visualize effects associated with frequency lowering. In the example shown in FIG. 4, the compressed frequencies shown in line graph 308 may be considered as the second set of frequencies and output frequency-based curve 402 may correspond to a first output frequency-based curve.

FIG. 5 depicts how the thresholds associated with output frequency-based curve 402 may be represented based on an inverse application of the frequency lowering scheme. As shown in FIG. 5, the inverse application of the frequency lowering scheme results in, for example, the threshold at approximately 2.4 kHz in FIG. 4 being represented at 8 kHz in FIG. 5. This process may be repeated for other thresholds depicted in FIG. 4 between approximately 600 Hz to approximately 2.4 kHz to result in output frequency-based curve 504. Output frequency-based curve 504 may correspond to the second frequency-based curve described herein. Output frequency-based curve 504 depicts output sound pressure thresholds in relation to a range of input audio frequencies that result in generating corresponding frequency lowered sound levels. As shown in FIG. 5, maximum output limit curve 302 from FIG. 3 is also expanded and flattened as a result of the inverse application of the frequency lowering scheme to form maximum output limit curve 502.

The exemplary process depicted in FIGS. 3-5 is provided for illustrative purposes only to show how a second output frequency-based curve such as frequency-based curve 504 may be provided in certain implementations. It is understood that such a process of changing output frequency-based curve 304 shown in FIG. 3 to output frequency-based curve 504 shown in FIG. 5 may be transparent to an audiologist or the like during a hearing device fitting procedure. That is, as an amount of frequency lowering is increased, system 100 may depict output frequency-based curve 304 expanding and flattening (e.g., by way of an animation) to form output frequency-based curve 504 without showing the intermediate process of forming output frequency-based curve 402 shown in FIG. 4. Similarly, as the amount of frequency lowering is increased, system 100 may depict maximum output limit curve 302 expanding and flattening (e.g., by way of an animation) to form maximum output limit curve 502 without showing any intermediate processing of maximum output limit curve 302.

Figure 6:
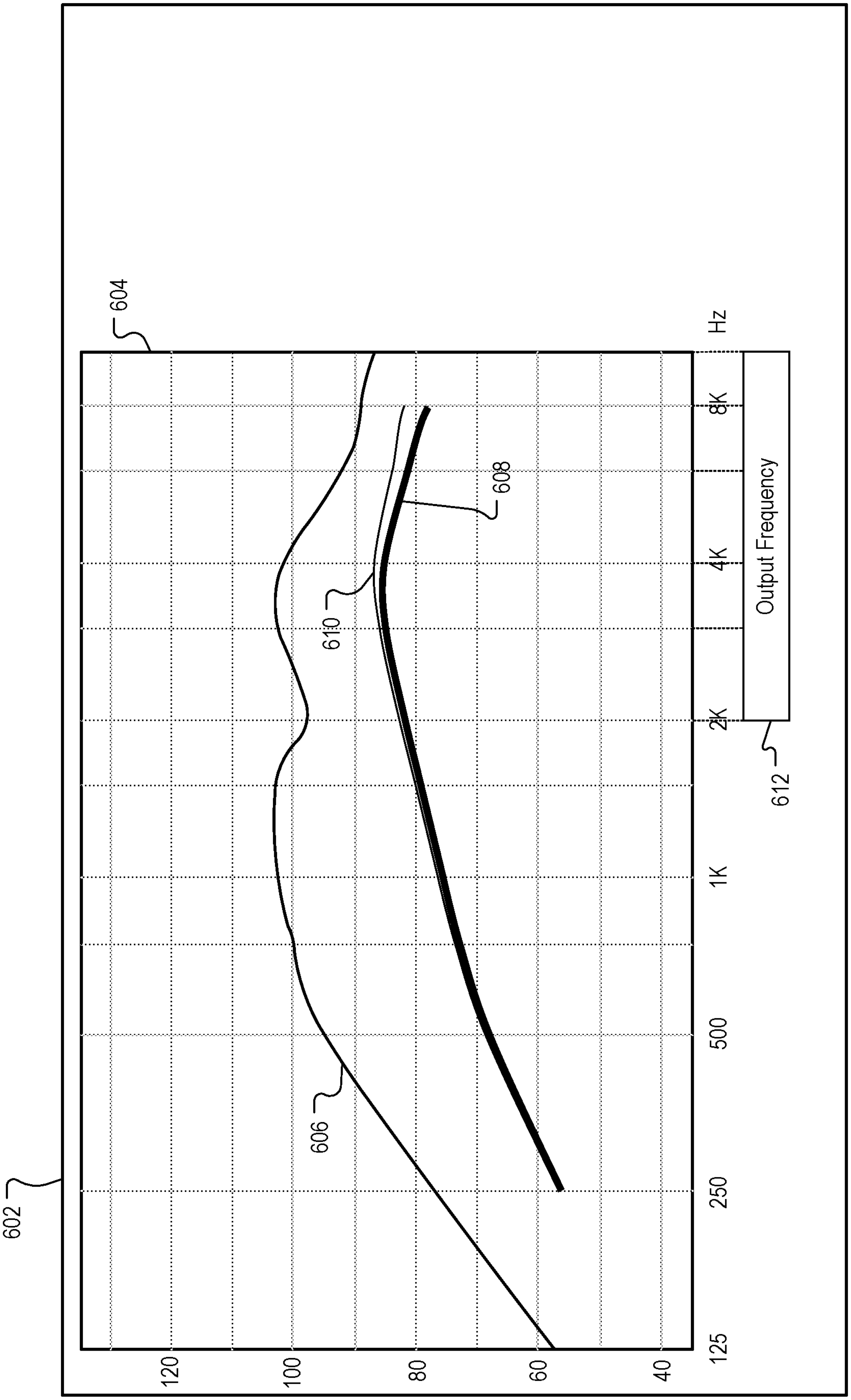
FIGS. 6-14 illustrate exemplary graphical user interface views that may be provided for display by way of a display device to facilitate visualizing effects of implementing a frequency lowering scheme according to principles described herein.

FIG. 6 shows an exemplary graphical user interface view 602 that may be provided for display to an audiologist to facilitate visualizing effects of a frequency lowering scheme applied by hearing device 202. As shown in FIG. 6, graphical user interface view 602 includes a graph 604 that includes a first axis (x-axis) to which the first set of audio frequencies is assigned and a second axis (y-axis) to which sound levels are assigned. In the example shown in FIG. 6, graph 604 includes maximum output limit curve 606, which may represent a maximum output capacity of hearing device 202, an output level curve 608 corresponding to a specific sound input level (e.g., an 80 dB sound input level), and a target output level curve 610 for the specific sound input level.

FIG. 6 depicts how maximum output limit curve 606, output level curve 608, and target output level curve 610 may appear prior to application of a frequency lowering scheme. This is shown in FIG. 6 by an output frequency indicator 612 that depicts a portion of the range of frequencies shown in FIG. 6 that may be subject to frequency lowering and how the input frequencies along the first axis are currently mapped to output frequencies.

Figure 7:
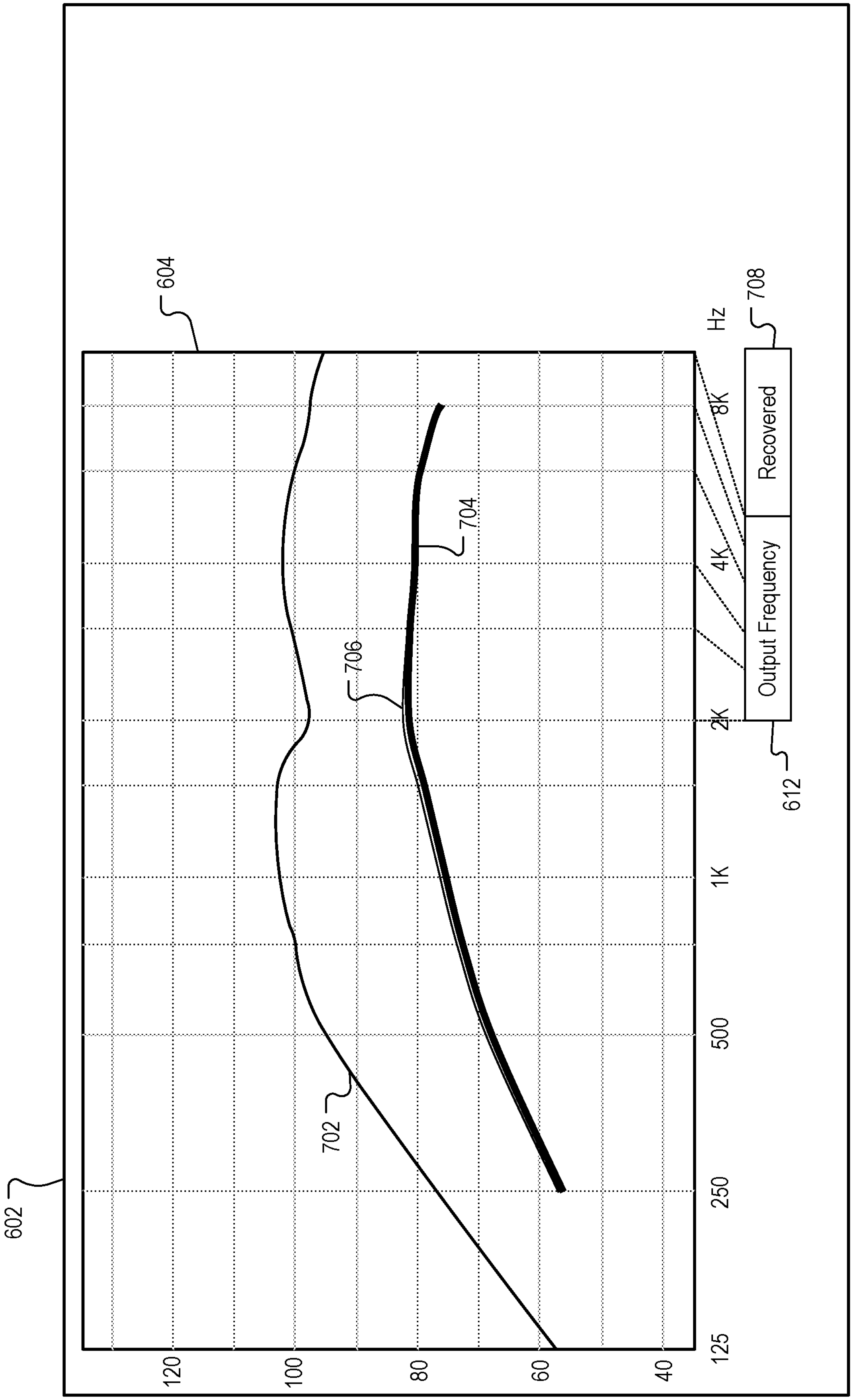

In response to application of the frequency lowering scheme, system 100 may modify an appearance of the curves shown in graph 604 to visualize the effects of frequency lowering. This is shown in FIG. 7, which depicts a frequency lowered maximum output limit curve 702, a frequency lowered output level curve 704, and a frequency lowered target output level curve 706. Frequency lowered maximum output limit curve 702 depicts how maximum output limit curve 606 may appear after the frequency lowering. Frequency lowered output level curve 704 depicts how output level curve 608 may appear after the frequency lowering. Frequency lowered target output level curve 706 depicts how target output level curve 610 may appear after the frequency lowering.

As shown in FIG. 7, output frequency indicator 612 shows a mapping of a range of output frequencies to the input frequencies along the x-axis. A recovered indicator 708 depicts a range of frequencies where audibility of the user of hearing device 202 is recovered as a result of the frequency lowering. In the example shown in FIG. 7, an input audio frequency of, for example, 8 kHz is mapped to approximately 4.5 kHz. However, the frequency lowered curves shown in graph 604 are depicted with respect to the range of input frequencies shown along the x-axis, which results in an improved visualization of the effects of frequency compression as compared to conventional methods.

System 100 may facilitate a user (e.g., an audiologist) adjusting an amount of frequency lowering applied during a hearing device fitting session in any suitable manner. For example, system 100 may present, within a graphical user interface view, an option for a user to adjust an amount of a frequency lowering setting to be used by the hearing device. Such an option may be implemented by any suitable type of user input mechanism that may facilitate adjusting an amount of frequency lowering. In certain examples, the option may be implemented by a slider graphical object that may be manipulated in any suitable manner by a user during a hearing device fitting session to adjust an amount of frequency lowering.

Figure 8:
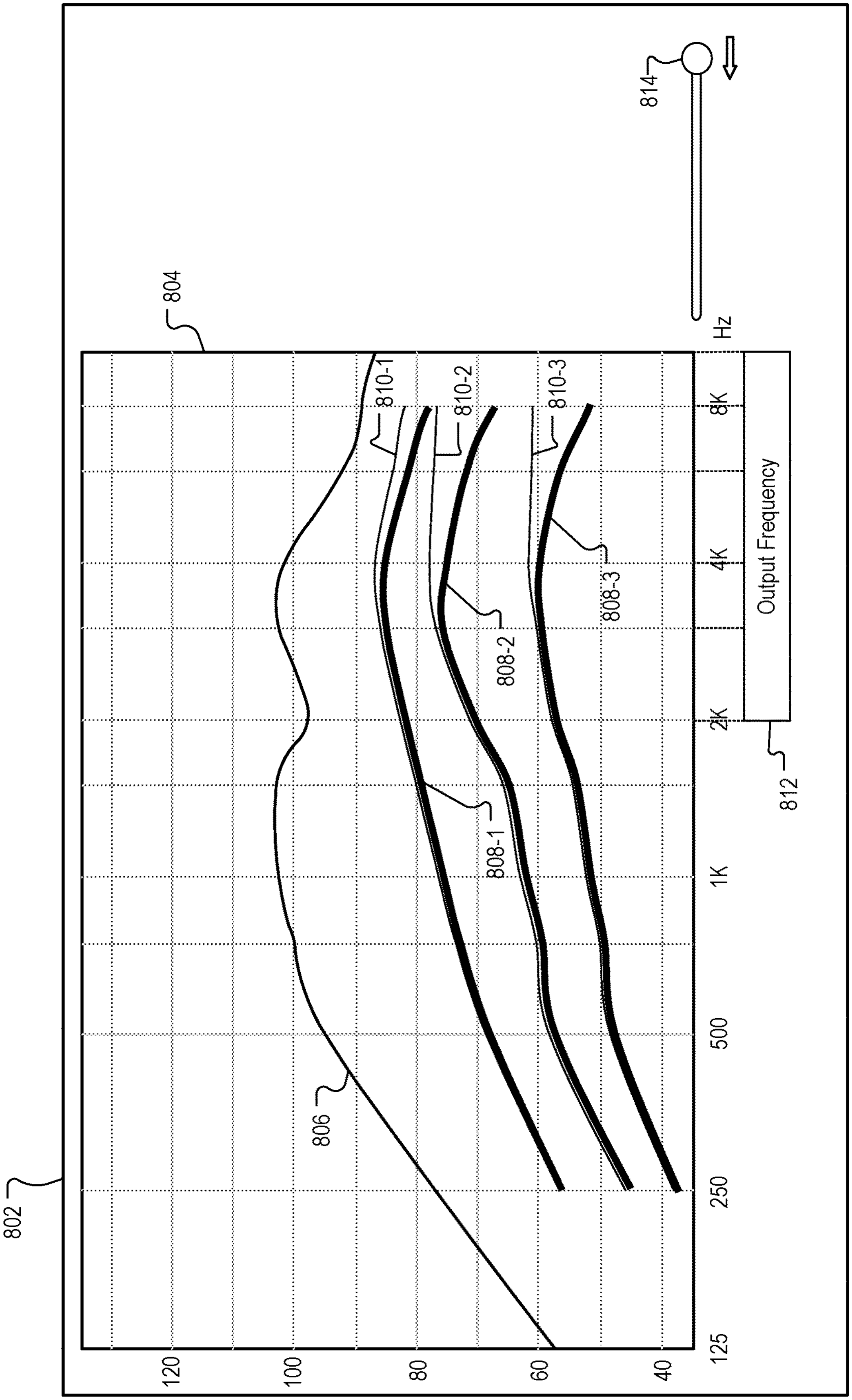

To illustrate, FIG. 8 shows an exemplary graphical user interface view 802 that may be presented during a hearing device fitting session in certain examples. As shown in FIG. 8, graphical user interface view 802 includes a graph 804 that includes a maximum output limit curve 806, a plurality of output level curves 808 (e.g., output level curves 808-1 through 808-3), and a plurality of target output level curves 810 (e.g., target output level curves 810-1 through 810-3). Each of output level curves 808 may correspond to a different sound input level included in a plurality of sound input levels. For example, output level curve 808-1 may correspond to an 80 dB sound input level, output level curve 808-2 may correspond to a 65 dB sound input level, and output level curve 808-3 may correspond to a 50 dB sound input level.

FIG. 8 depicts how maximum output limit curve 806, output level curves 808, and target output level curves 810 may appear prior to application of a frequency lowering scheme. This is shown in FIG. 8 by an output frequency indicator 812 that depicts a portion of the range of frequencies shown in FIG. 8 that may be subject to frequency lowering and how the input frequencies along the first axis are mapped to output frequencies.

FIG. 8 further depicts a slider graphical object 814 that a user may interact with in any suitable manner (e.g., through a touch input, a mouse cursor input, etc.) to adjust an amount of frequency lowering. Moving slider graphical object 814 to the left may increase the amount of frequency lowering to be applied by hearing device 202 whereas moving slider graphical object 814 to the right may decrease the amount of frequency lowering to be applied by hearing device 202. In the example shown in FIG. 8, slider graphical object 814 is depicted on a rightmost side of a slider bar because no frequency compression is currently applied.

Figure 9:
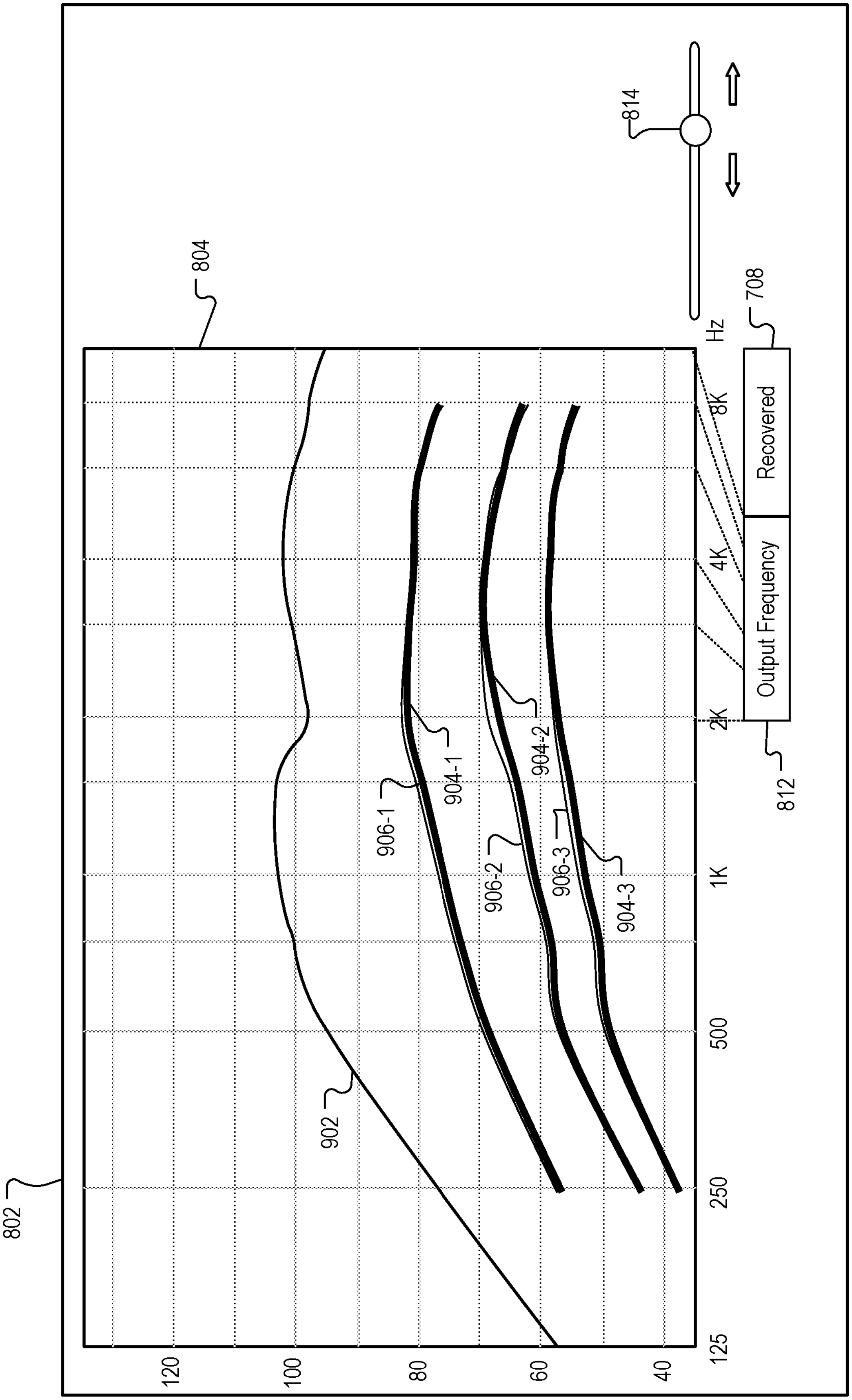

System 100 may detect a selection of a frequency lowering setting to be used by hearing device 202 based on a user input provided with respect to slider graphical object 814. In response to, for example, a user input moving slider graphical object 814 leftward, system 100 may expand and represent the various curves shown in FIG. 8 with respect to the range of input frequencies depicted along the x-axis. This is shown in FIG. 9, which depicts a frequency lowered maximum output limit curve 902, a plurality frequency lowered output level curves 904 (e.g., frequency lowered output level curves 904-1 through 904-3), and a plurality of frequency lowered target output level curve 906 (e.g., frequency lowered target output level curves 906-1 through 906-3). Frequency lowered maximum output limit curve 902 depicts how maximum output limit curve 806 may appear based on the frequency lowering setting indicated by slider graphical object 814. Frequency lowered output level curves 904 depict how output level curves 808 may appear based on the frequency lowering setting indicated by slider graphical object 814. Frequency lowered target output level curves 906 depict how target output level curves 810 may appear based on the frequency lowering setting indicated by slider graphical object 814.

Figure 10:
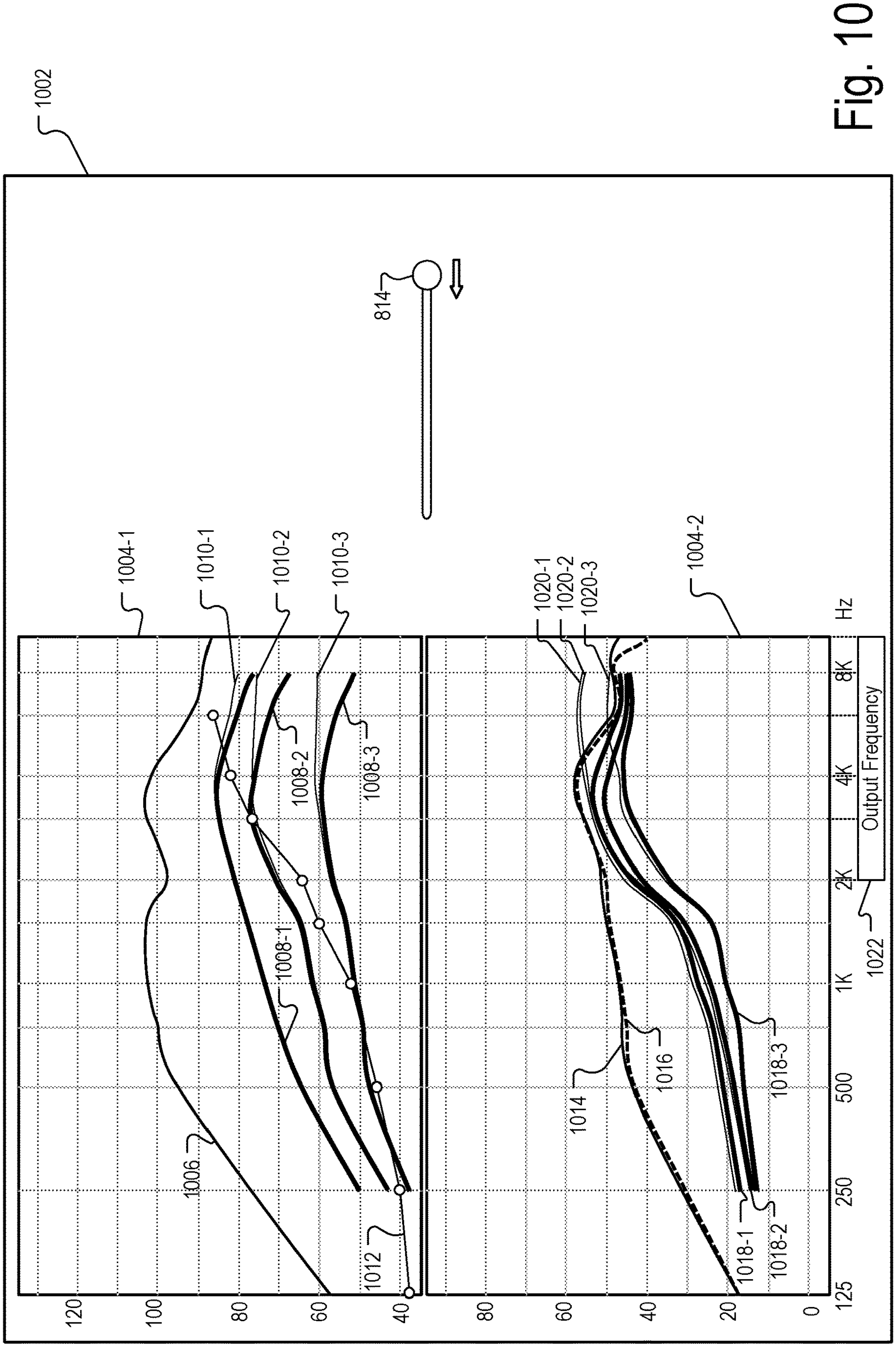

FIG. 10 depicts another exemplary graphical user interface view 1002 that may be presented by system 100 in certain examples to facilitate visualizing the effects of frequency lowering. As shown in FIG. 10, graphical user interface view 1002 includes a plurality of graphs 1004 (e.g., graph 1004-1 and graph 1004-2) that are concurrently displayed together. Graph 1004-1 includes a first axis (x-axis) to which the input audio frequencies are assigned and a second axis (y-axis) to which output sound levels are assigned. As shown in FIG. 10, graph 1004-1 includes a maximum output limit curve 1006, a plurality of output level curves 1008 (e.g., output level curves 1008-1 through 1008-3), a plurality of target output level curves 1010 (e.g., target output level curves 1010-1 through 1010-3), and a sound pressure level curve 1012 (also referred to as an SPLogram). Each of output level curves 1008 may correspond to a different sound input level. For example, output level curve 1008-1 may correspond to an 80 dB sound input level, output level curve 1008-2 may correspond to a 65 dB sound input level, and output level curve 1008-3 may correspond to a 50 dB sound input level.

Graph 1004-2 includes a first axis (x-axis) to which the input audio frequencies are assigned and a second axis (y-axis) to which output gain levels are assigned. As shown in FIG. 10, graph 1004-2 includes a maximum gain limit curve 1014, a feedback threshold curve 1016, a plurality of gain level curves 1018 (e.g., gain level curves 1018-1 through 1018-3), and a plurality of target gain level curves 1020 (e.g., target gain level curves 1020-1 through 1020-3). Each of gain level curves 1018 may correspond to a different sound input level. For example, gain level curve 1018-1 may correspond to an 80 dB sound input level, gain level curve 1018-2 may correspond to a 65 dB sound input level, and gain level curve 1018-3 may correspond to a 50 dB sound input level.

The deviations between gain level curves 1018 and target gain level curves 1020 shown in graph 1004-2 indicate that the targets (which may be linked to sound pressure level curve 1012) cannot be reached any better through, for example, feedback management/overtuning.

Graphical user interface view 1002 shown in FIG. 10 further depicts an output frequency indicator 1022 that illustrates a portion of the frequencies along the x-axis that may be subject to frequency lowering and how the input frequencies along the x axis are currently mapped with respect to output frequencies.

Graphical user interface view 1002 shown in FIG. 10 further depicts slider graphical object 814 that a user may interact with in any suitable manner such as described herein to adjust a frequency lowering setting to be applied by hearing device 202. In the example shown in FIG. 10, slider graphical object 814 is provided on a rightmost side of the slider bar indicating that no frequency lowering is currently applied.

Figure 11:
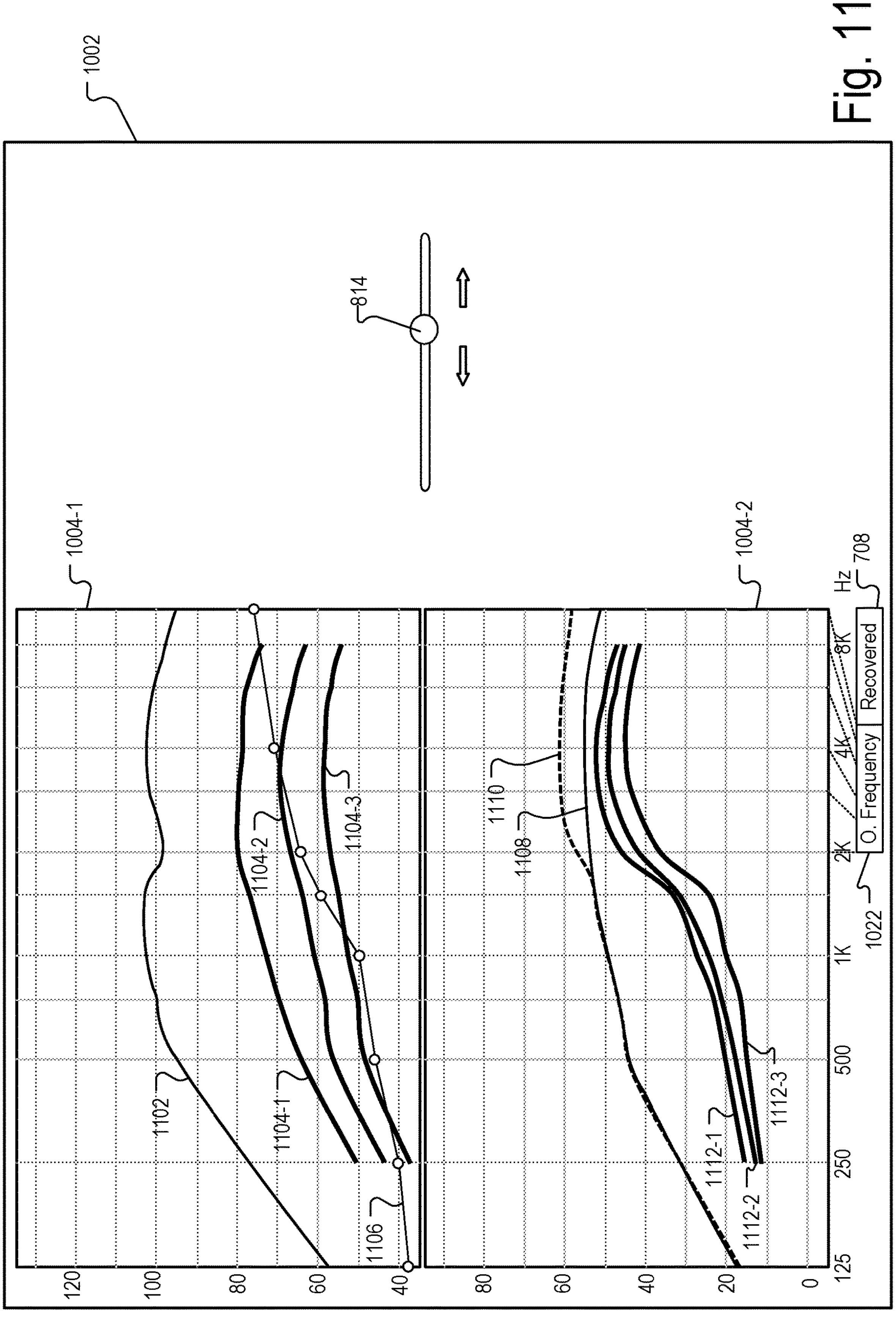

System 100 may detect any suitable user input provided with respect to slider graphical object 814 and adjust the various curves depicted in FIG. 10 according to principles such as those described herein. For example, FIG. 11 depicts how the various curves shown in FIG. 10 may change based on a frequency lowering setting indicated by the position of slider graphical object 814 shown in FIG. 11. As shown in FIG. 11, graph 1004-1 includes a frequency lowered maximum output limit curve 1102, a plurality of frequency lowered output level curves 1104 (e.g., frequency lowered output level curves 1104-1 through 1104-3), and a frequency lowered sound pressure level curve 1106. Although not shown in FIG. 11, it is understood that graph 1004-1 may further include one or more frequency lowered target output level curves that correspond respectively to modified versions of target output level curves 1010.

As further shown in FIG. 11, graph 1004-2 includes a frequency lowered maximum gain limit curve 1108, a frequency lowered feedback threshold curve 1110, and a plurality of frequency lowered gain level curves 1112 (e.g., frequency lowered gain level curves 1112-1 through 1112-3). Although not shown in FIG. 11, it is understood that graph 1004-2 may further present one or more frequency lowered target gain level curves that correspond respectively to modified versions of target gain level curves 1020.

Output frequency indicator 1022 shown in FIG. 11 indicates a mapping between a range of output frequencies represented by output frequency indicator 1022 and the range of input frequencies shown along the x-axis.

As shown in FIG. 11, frequency lowered maximum output limit curve 1102, frequency lowered maximum gain limit curve 1108, and frequency lowered sound pressure level curve 1106 are stretched along the x-axis as well as the other curves shown in FIG. 11. Frequency compressed sound pressure level curve 1106 indicates a high frequency hearing loss but indicates that high input frequencies are, based on the frequency lowering, now configured to reach an eardrum of the user of hearing device 202 at lower frequencies, which provides better audibility (e.g., lower hearing thresholds). This in turn leads to lower target prescriptions across the input frequency spectrum depicted along the x-axis.

Figure 12:
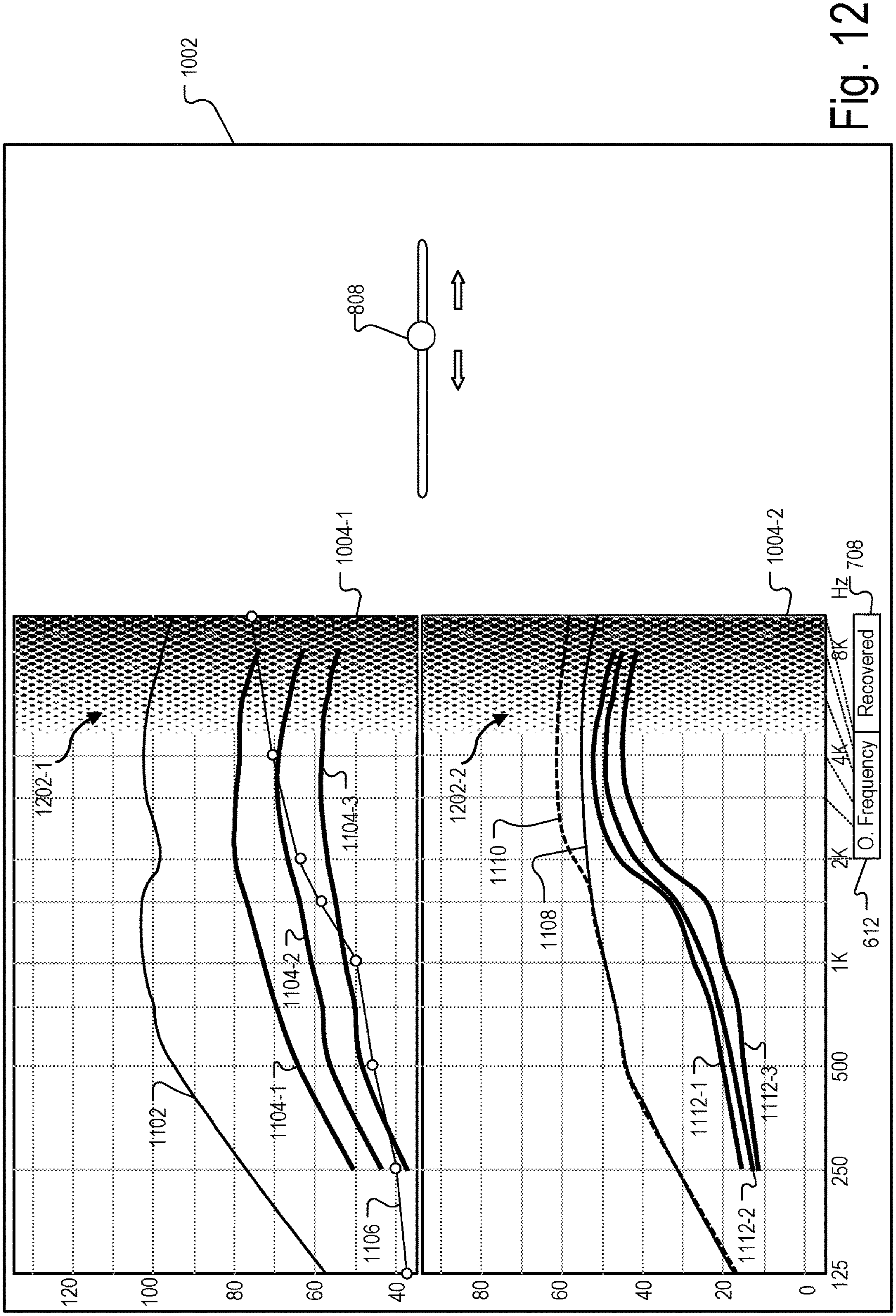

As the amount of frequency lowering applied by hearing device 202 increases, degradation of sound quality and/or alienation of incoming sound increases. To facilitate visualizing such effects, system 100 may, in certain examples, be configured to present, within a graphical user interface view and within a graph, a graphical indicator depicting an amount of frequency lowering to be applied by hearing device 202 based on a frequency lowering setting. System 100 may present such a graphical indicator in any suitable manner as may serve a particular implementation. For example, a graphical indicator may include coloring, shading, and/or any other suitable visual indicator that may be provided for display within a portion of a graph affected by a current frequency lowering setting. To illustrate an example, FIG. 12 shows a graphical indicator 1202-1 provided within graph 1004-1 and a graphical indicator 1202-2 provided within graph 1004-2. The relatively darker portions of graphical indicators 1202 depict portions of the input audio frequency range where relatively more degradation of sound quality and/or more alienation of incoming sound occur as a result of the frequency lowering setting indicated by slider graphical object 814.

Figure 13:
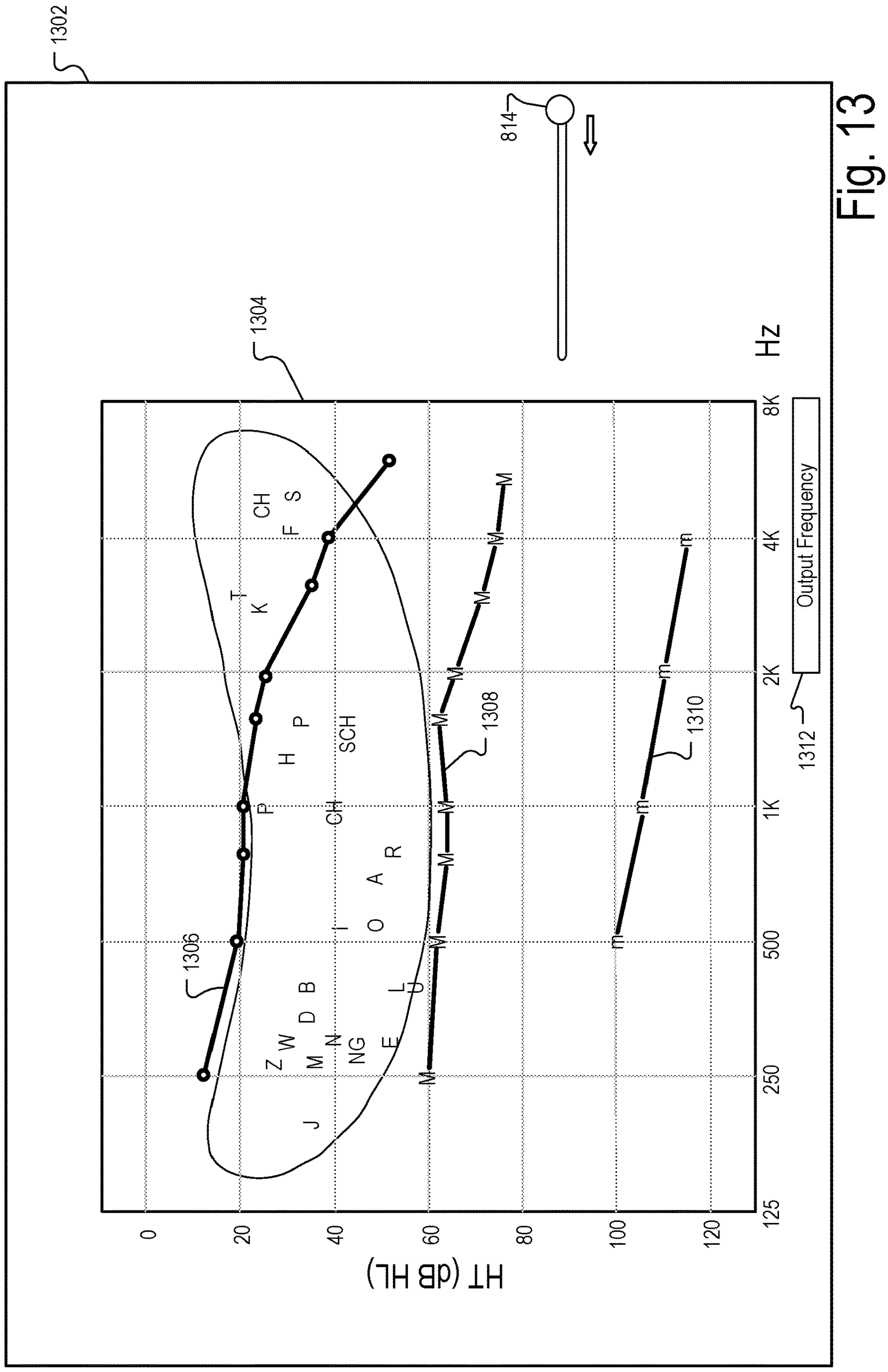

FIG. 13 shows how principles such as those described herein may be implementing in a graphical user interface view 1302 that depicts an aided audiogram. As shown in FIG. 13, graphical user interface view 1302 includes a graph that includes a first axis (x-axis) to which input audio frequencies are assigned and a second axis (y-axis) to which sound levels are assigned. Graph 1304 includes various isophone curves such as an audibility threshold curve 1306, a most comfortable level curve 1308, and a discomfort threshold curve 1310. Audibility threshold curve 1306 may correspond to a zero phone isophone, most comfortable level curve 1308 may correspond to a sixty phone isophone, and discomfort threshold curve 1310 may correspond to a one hundred phone isophone.

The various curves shown in FIG. 13 are provided for illustrative purposes. It is understood that additional or alternative curves may be presented within graph 1304 in certain examples.

An output frequency indicator 1312 shown in FIG. 13 indicates a mapping between a range of output frequencies represented by output frequency indicator 1312 and the range of input frequencies shown along the x-axis.

Figure 14:
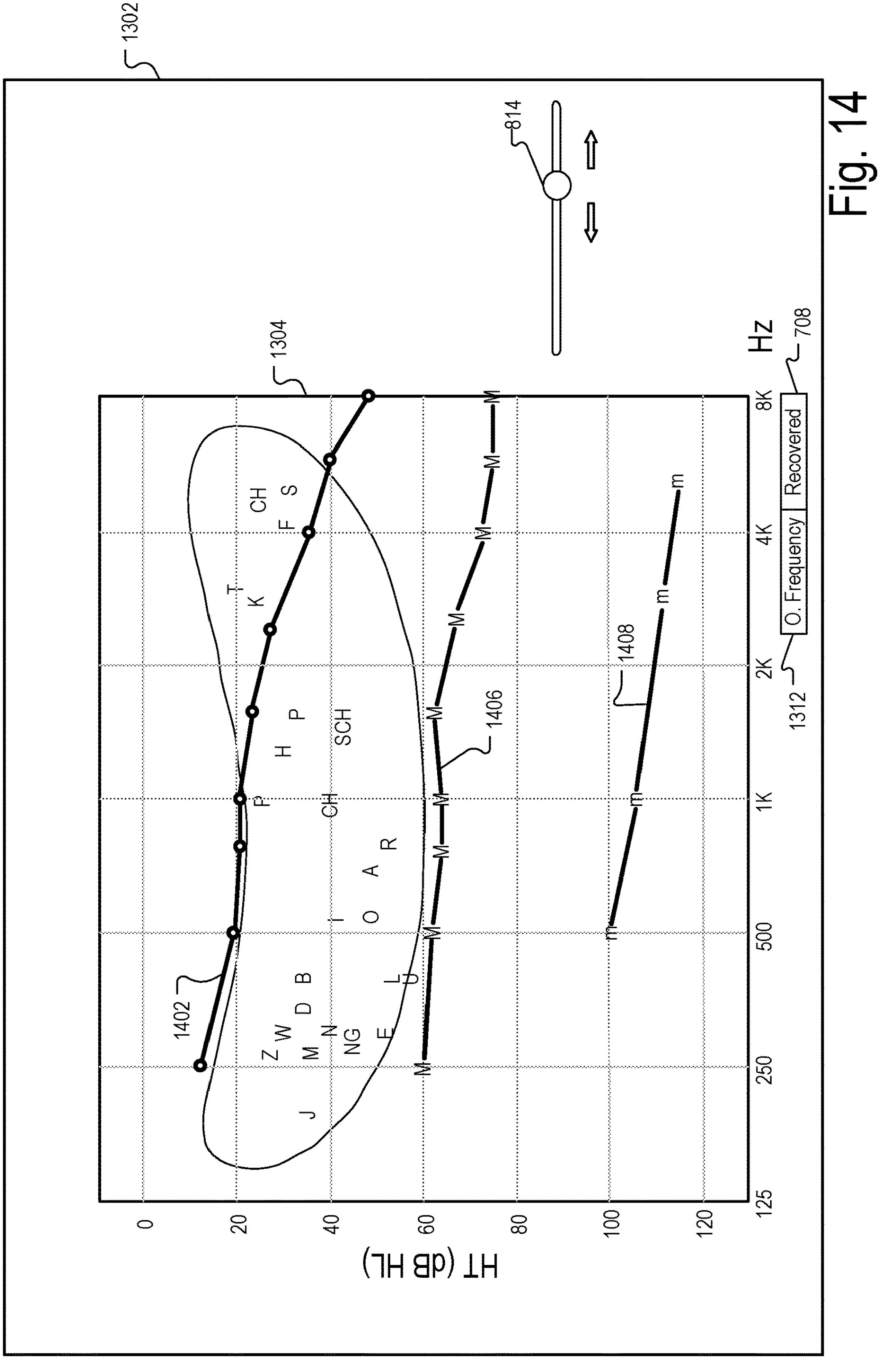

System 100 may detect any suitable user input provided with respect to slider graphical object 814 and adjust the various curves depicted in FIG. 13 according to principles such as those described herein. For example, FIG. 14 depicts how the various curves shown in FIG. 13 may change based on a frequency lowering setting indicated by the position of slider graphical object 814 shown in FIG. 13. As shown in FIG. 14, graph 1304 includes a frequency lowered audibility threshold curve 1402, a frequency lowered most comfortable level curve 1406, and a frequency lowered discomfort threshold curve 1408.

In certain examples implementing a frequency lowering scheme may undesirably change the audibility of the user. Accordingly, system 100 may implement a modified audiogram (also referred to as a frequency lowering scheme-based audiogram), which may be presented within graphical user interface views such as those described herein. Such a modified audiogram may be used in place of a conventional audiogram to fit hearing device 202 to the user. Such a modified audiogram may be based on a conventional audiogram of a user but may be changed such as described herein to compensate for the changes in audibility of the user that may be caused by application of a frequency lowering scheme. Such a modified audiogram may indicate a set of modified hearing thresholds of a user at a first set of audio frequencies, which set of modified hearing thresholds may be based on a set of hearing thresholds of the user at a second set of audio frequencies.

In certain examples, system 100 may access a modified audiogram from any suitable source to facilitate fitting hearing device 202 to a user. For example, system 100 may receive an already generated modified audiogram from a third party (e.g., a hearing care professional, an audiologist, etc.) in certain examples.

In certain alternative examples, system 100 may generate a modified audiogram. This may be accomplished in any suitable manner. For example, system 100 may apply a frequency lowering scheme to a set of reference hearing thresholds at the first set of audio frequencies. As used herein, a "set of reference hearing thresholds" may represent any suitable gain-dependent hearing thresholds of a reference user with "normal" hearing capability. In certain examples, a set of reference hearing thresholds across a range of audio frequencies may correspond to a 0 dB hearing level of an idealized or standardized "normal" person (e.g., person with "normal" hearing capability), a hearing threshold level ("HTL") in general, an isophone, a most comfortable level ("MCL"), an uncomfort level ("UCL"), or any other suitable reference level.

System 100 may apply a frequency lowering scheme to a set of reference hearing thresholds in any suitable manner. For example, in certain implementations, system 100 may apply frequency compression to the set of reference hearing thresholds. In certain implementations, system 100 may apply one or more mappings (e.g., compression, shifting, translation, etc.) when implementing, for example, an adaptive frequency compression scheme. For example, system 100 may perform a first mapping from a first set of audio frequencies to a second set of audio frequencies, a second mapping from the second set of audio frequencies to an audiogram of the user, and a third mapping from the audiogram of the user to the first set of audio frequencies.

System 100 may apply a frequency lowering scheme to a set of reference hearing thresholds to obtain frequency lowered reference hearing thresholds at a second set of audio frequencies. Such frequency lowered reference hearing thresholds may be indicative of changes that may occur to the set of reference hearing thresholds as a result of applying the frequency lowering scheme. Based on the frequency lowered hearing thresholds, system 100 may determine a set of modified hearing thresholds, for the user, at the second set of audio frequencies.

System 100 may determine the set of modified hearing thresholds in any suitable manner. For example, in certain implementations, the determining of the set of modified hearing thresholds may include determining a correction amount between the set of reference hearing thresholds at the second set of audio frequencies and the frequency lowered reference hearing thresholds across the second set of audio frequencies. In certain examples, the correction amount may include a plurality of correction amounts across a range of audio frequencies. For example, system 100 may determine a first correction amount corresponding to a first frequency included in the second set of audio frequencies, a second correction amount corresponding to a second frequency included in the second set of audio frequencies, third correction amount corresponding to a third frequency included in the second set of audio frequencies, and so forth. System 100 may determine any suitable number of correction amounts across a range of audio frequencies as may serve a particular implementation.

After system 100 determines one or more correction amounts, system 100 may apply the one or more correction amounts to the set of reference hearing thresholds across the second set of audio frequencies any suitable manner. For example, system 100 may increase at least some hearing thresholds included in set of reference hearing thresholds and/or decrease at least some hearing thresholds included in the set of reference hearing thresholds to determine the set of modified hearing thresholds for the user of the hearing device.

After system 100 determines the set of modified hearing thresholds, system 100 may associate the set of modified hearing thresholds at the second set of audio frequencies with the first set of audio frequencies such that the modified audiogram represents the set of modified hearing thresholds, for the user, at the first set of audio frequencies. System 100 may associate the set of modified hearing thresholds with the first set of audio frequencies in any suitable manner. For example, in certain implementations, system 100 may apply an inverse of the frequency lowering scheme to the set of modified hearing thresholds at the second set of audio frequencies to obtain the set of modified hearing thresholds of the modified audiogram at the first set of audio frequencies.

System 100 may present the modified audiogram in any suitable manner within a graph presented in a graphical user interface view such as those described herein. In certain examples, system 100 may present in any suitable manner within a graph presented in a graphical user interface view such as those described herein a modified sound pressure level curve (also referred to as a modified SPLogram) that may be used to derive the modified audiogram.

Instead of system 100 using the audiogram of the user, system 100 may use the modified audiogram as an input to an input frequency-based target gain generation model to fit hearing device 202 to the user. As used herein, an "input frequency-based target gain generation model" may refer to any suitable fitting formula, prescription procedure, algorithm, etc. that may be used to fit hearing device 202 to the user. For example, system 100 may implement any suitable Desired Sensation Level ("DSL") prescription formula or any suitable prescription procedure from The National Acoustic Laboratories ("NAL") as an input frequency-based target gain generation model.

Based on an input frequency-based target gain generation model and the modified audiogram, system 100 may generate one or more target gain values for the user of hearing device 202. Such target gain values may indicate an amount of gain necessary for a user of hearing device 202 to perceive sound at a particular audio frequency. In certain examples, system 100 may determine a target gain curve that represents a target gain profile for useable gain by hearing device 202 across a range of audio frequencies.

In certain examples, system 100 may facilitate a user (e.g., an audiologist) toggling between graphical user interface views such as those described herein that depict frequency lowered sound levels (e.g., gain levels and/or output levels) in relation to a range of input audio frequencies and conventional graphical user interface views that depict frequency lowered sound levels (e.g., gain levels and/or output levels) in relation to output audio frequencies.

In certain examples, system 100 may be configured to provided graphical user interface views that facilitate combining feedback handling (e.g., feedback cancellation, overtuning, etc.) and frequency lowering adjustment such as described herein. With such graphical user interface views, it may be possible for a user to interactively test different ways of changing hearing device fitting ranges, which may facilitate determining the best compromise between sound alienation, acoustic stability, and satisfying requested output/gain levels.

Figure 15:
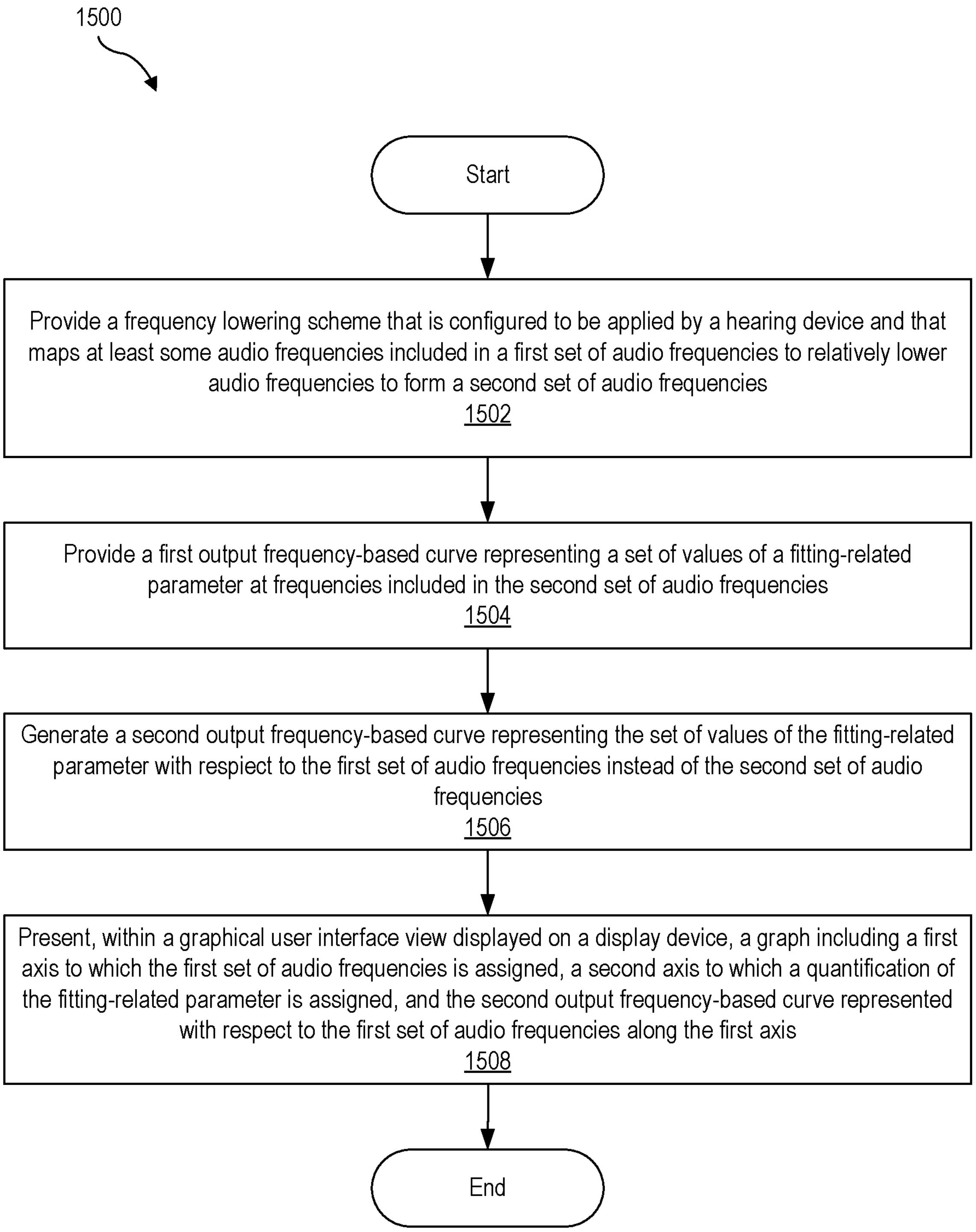
FIG. 15 illustrates an exemplary method according to principles described herein.

FIG. 15 illustrates an exemplary method 1500 for visualizing effects of a frequency lowering scheme implemented by a hearing device according to principles described herein. While FIG. 15 illustrates exemplary operations according to one embodiment, other embodiments may omit, add to, reorder, and/or modify any of the operations shown in FIG. 15. One or more of the operations shown in FIG. 15 may be performed by a hearing device such as hearing device 202 a computing device such as processor 104, any components included therein, and/or any combination or implementation thereof.

At operation 1502, a processor such as processor 104 may provide a frequency lowering scheme that is configured to be applied by a hearing device and that maps at least some audio frequencies included in a first set of audio frequencies to relatively lower audio frequencies to form a second set of audio frequencies. Operation 1502 may be performed in any of the ways described herein.

At operation 1504, the processor may provide a first output frequency-based curve representing a set of values of a fitting-related parameter at frequencies included in the second set of audio frequencies. Operation 1504 may be performed in any of the ways described herein.

At operation 1506, the processor may generate, based on an inverse application of the frequency lowering scheme to the first frequency-based curve, a second output frequency-based curve representing the set of values of the fitting-related parameter with respect to the first set of audio frequencies instead of the second set of audio frequencies. Operation 1506 may be performed in any of the ways described herein.

At operation 1508, the processor present, within a graphical user interface view displayed by a display device, a graph. The graph may include a first axis to which the first set of audio frequencies is assigned, a second axis to which a quantification of the fitting-related parameter is assigned, and the second output frequency-based curve represented with respect to the first set of audio frequencies along the first axis. Operation 1508 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 16:
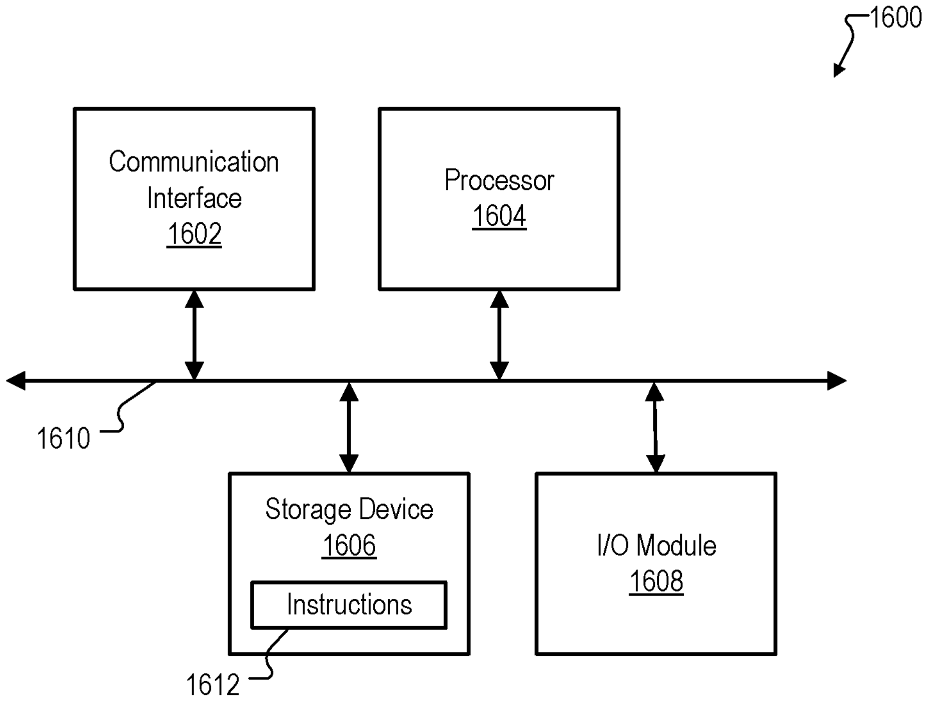
FIG. 16 illustrates an exemplary computing device according to principles described herein.

FIG. 16 illustrates an exemplary computing device 1600 that may be specifically configured to perform one or more of the processes described herein. As shown in FIG. 16, computing device 1600 may include a communication interface 1602, a processor 1604, a storage device 1606, and an input/output ("I/O") module 1608 communicatively connected one to another via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit capable of processing data and/or interpreting, executing, and/or directing execution of one or more of the instructions, processes, and/or operations described herein. Processor 1604 may perform operations by executing computer-executable instructions 1612 (e.g., an application, software, code, and/or other executable data instance) stored in storage device 1606.

Storage device 1606 may include one or more data storage media, devices, or configurations and may employ any type, form, and combination of data storage media and/or device. For example, storage device 1606 may include, but is not limited to, any combination of the non-volatile media and/or volatile media described herein. Electronic data, including data described herein, may be temporarily and/or permanently stored in storage device 1606. For example, data representative of computer-executable instructions 1612 configured to direct processor 1604 to perform any of the operations described herein may be stored within storage device 1606. In some examples, data may be arranged in one or more databases residing within storage device 1606.

I/O module 1608 may include one or more I/O modules configured to receive user input and provide user output. I/O module 1608 may include any hardware, firmware, software, or combination thereof supportive of input and output capabilities. For example, I/O module 1608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 1600. For example, memory 102 may be implemented by storage device 1606 and processor 104 may be implemented by processor 1604.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

a memory storing instructions; and a processor communicatively coupled to the memory and configured to execute the instructions to:

provide a frequency lowering scheme that is configured to be applied by a hearing device and that maps at least some audio frequencies included in a first set of audio frequencies to relatively lower audio frequencies to form a second set of audio frequencies;

provide a first output frequency-based curve representing a set of values of a fitting-related parameter at frequencies included in the second set of audio frequencies;

generate, based on an inverse application of the frequency lowering scheme to the first output frequency-based curve, a second output frequency-based curve representing the set of values of the fitting-related parameter with respect to the first set of audio frequencies instead of the second set of audio frequencies; and present, within a graphical user interface view displayed on a display device, a graph including:

a first axis to which the first set of audio frequencies is assigned;

a second axis to which a quantification of the fitting-related parameter is assigned; and the second output frequency-based curve represented with respect to the first set of audio frequencies along the first axis.

2. The system of claim 1, wherein the fitting-related parameter corresponds to a sound level and the quantification assigned to the second axis represents output sound levels.

3. The system of claim 2, wherein the output sound levels correspond to output sound pressure levels.

4. The system of claim 1, wherein the processor is further configured to execute the instructions to present, within the graphical user interface view, an additional graph including:

a third axis to which the first set of audio frequencies is assigned;

a fourth axis to which output gain levels are assigned; and at least one input frequency-based curve that represents gain values at an output of gain of the hearing device across the first set of audio frequencies along the third axis.

5. The system of claim 4, wherein the graph and the additional graph are provided for concurrent display within the graphical user interface view.

6. The system of claim 4, wherein the at least one input frequency-based curve includes at least one of:

a first gain curve corresponding to a first sound input level;

a second gain curve corresponding to a second sound input level;

a third gain curve corresponding to a third sound input level;

a fourth gain curve corresponding to a current listening environment; or a fifth gain curve corresponding to an insertion gain curve, wherein the first sound input level, the second sound input level, and the third sound input level correspond to different sound input levels.

7. The system of claim 1, wherein the processor is further configured to execute the instructions to present, within the graphical user interface view and concurrently with the second output frequency-based curve, at least one input frequency-based curve that represents output levels an output of the hearing device across the first set of audio frequencies along the first axis.

8. The system of claim 7, wherein the at least one input frequency-based curve includes at least one of:

a first output level curve corresponding to a first sound input level;

a second output level curve corresponding to a second sound input level;

a third output level curve corresponding to a third sound input level; or a fourth output level curve corresponding to a current listening environment, wherein the first sound input level, the second sound input level, and the third sound input level correspond to different sound input levels.

9. The system of claim 1, wherein the second output frequency-based curve is one of:

a curve visualizing auditory thresholds of a user of the hearing device;

a curve visualizing environmental comfort thresholds of the user of the hearing device;

a curve visualizing feedback thresholds for the hearing device;

a curve visualizing a maximum achievable level for the hearing device;

a curve visualizing supplied isophones; or a curve visualizing a supplied isophone-like threshold or perception curve.

10. The system of claim 1, wherein the processor is further configured to execute the instructions to present, within the graphical user interface view and concurrently with the graph, an option for a user to adjust an amount of a frequency lowering setting to be used by the hearing device.

11. The system of claim 1, wherein the processor is further configured to execute the instructions to present, within the graphical user interface view and within the graph, a graphical indicator depicting an amount of frequency lowering to be applied by the hearing device based on a frequency lowering setting.

12. The system of claim 11, wherein the graphical indicator includes coloring or shading provided for display within a portion of the graph affected by a current frequency lowering setting.

13. A system comprising:

a memory storing instructions; and a processor communicatively coupled to the memory and configured to execute the instructions to:

detect a selection of a frequency lowering setting to be used by a hearing device configured to implement a frequency lowering scheme that maps at least some audio frequencies included in a first set of audio frequencies to relatively lower audio frequencies to form a second set of audio frequencies; and present, within a graphical user interface view displayed on a display device and based on the selection of the frequency lowering setting, a graph including:

a first axis to which the first set of audio frequencies is assigned;

a second axis to which a quantification of a fitting-related parameter is assigned; and an output frequency-based curve, the output frequency-based curve generated based on an inverse application of the frequency lowering scheme that results in a set of values of the fitting-related parameter at the second set of audio frequencies being represented with respect to the first set of audio frequencies instead of the second set of audio frequencies.

14. The system of claim 13, wherein the processor is further configured to execute the instructions to:

detect an additional selection of an additional frequency lowering setting; and modify, based on the additional selection of the additional frequency lowering setting, the set of values of the fitting-related parameter along at least a portion of the output frequency-based curve represented with respect to the first set of audio frequencies.

15. The system of claim 13, wherein:

the processor is further configured to execute the instructions to present, within the graphical user interface view and concurrently with the graph, an option for a user to adjust an amount of the frequency lowering setting to be used by the hearing device; and the detecting of the selection of the frequency lowering setting includes detecting a user input provided with respect to the option.

16. A method comprising:

providing a frequency lowering scheme that is configured to be applied by a hearing device and that maps at least some audio frequencies included in a first set of audio frequencies to relatively lower audio frequencies to form a second set of audio frequencies;

providing a first output frequency-based curve representing a set of values of a fitting-related parameter at frequencies included in the second set of audio frequencies;

generating, based on an inverse application of the frequency lowering scheme to the first frequency-based curve, a second output frequency-based curve representing the set of values of the fitting-related parameter with respect to the first set of audio frequencies instead of the second set of audio frequencies; and presenting, within a graphical user interface view displayed on a display device, a graph including:

a first axis to which the first set of audio frequencies is assigned;

a second axis to which a quantification of the fitting-related parameter is assigned; and the second output frequency-based curve represented with respect to the first set of audio frequencies along the first axis.

17. The method of claim 16, further comprising presenting, within the graphical user interface view and concurrently with the graph, an option for a user to adjust an amount of a frequency lowering setting to be used by the hearing device.

18. The method of claim 17, further comprising:

detecting a user input with respect to the option to adjust the amount of the frequency lowering setting to be used by the hearing device; and modifying, based on the user input, at least a portion of the second output frequency-based curve represented with respect to the first set of audio frequencies.

19. The method of claim 17, further comprising presenting, within the graphical user interface view and within the graph, a graphical indicator depicting an amount of frequency lowering to be applied by the hearing device based on a frequency lowering setting.

20. The method of claim 19, wherein the graphical indicator includes coloring or shading provided for display with respect to a portion of the graph affected by a current frequency lowering setting.

* * * * *